US008290992B2

(12) United States Patent
Sakamoto

(10) Patent No.: US 8,290,992 B2
(45) Date of Patent: Oct. 16, 2012

(54) FILE MANAGEMENT METHOD, FILE MANAGEMENT DEVICE, AND PROGRAM

(75) Inventor: Yuu Sakamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 572 days.

(21) Appl. No.: 12/356,007

(22) Filed: Jan. 19, 2009

(65) Prior Publication Data

US 2009/0187603 A1    Jul. 23, 2009

(30) Foreign Application Priority Data

Jan. 23, 2008    (JP) .................. 2008-012444

(51) Int. Cl.
G06F 12/00    (2006.01)
G06F 17/30    (2006.01)
G06F 7/00     (2006.01)

(52) U.S. Cl. ..................................... 707/818

(58) Field of Classification Search .................. 707/205, 707/818
See application file for complete search history.

(56) References Cited

FOREIGN PATENT DOCUMENTS

| JP | 1998293711 A | 11/1998 |
| JP | 2003516586 A | 5/2003 |
| JP | 2003280974 A | 10/2003 |
| JP | 2005-010950 | * 1/2005 |
| JP | 2005010950 A | 1/2005 |
| JP | 2005-293016 | * 10/2005 |
| JP | 2007034642 A | 2/2007 |

OTHER PUBLICATIONS

Japanese Office Action for JP2008-012444 issued Oct. 27, 2009.
M, Nakajima, "Method of establishing a Web server (the 6th)", Linux magazine, Japan, Ascii Corporation, Feb. 1, 2000, vol. 2, No. 2, p. 181-186.

* cited by examiner

Primary Examiner — Jacob F Bétit
Assistant Examiner — Christy Lin

(57) ABSTRACT

A file management method includes creating a rotation group by grouping a file group in which the generations of the files are managed by changes in the file names, and storing information of the rotation group in a rotation group management unit; acquiring file identification information of the files belonging to the rotation group from the file group according to the information of the rotation group, and storing the file identification information in a file identification information management unit; and acquiring file identification information of the rotation group from the file identification information management unit, further acquiring file identification information of the files belonging to the rotation group from the file group according to the information of the rotation group, and comparing the acquired pieces of file identification information.

10 Claims, 11 Drawing Sheets

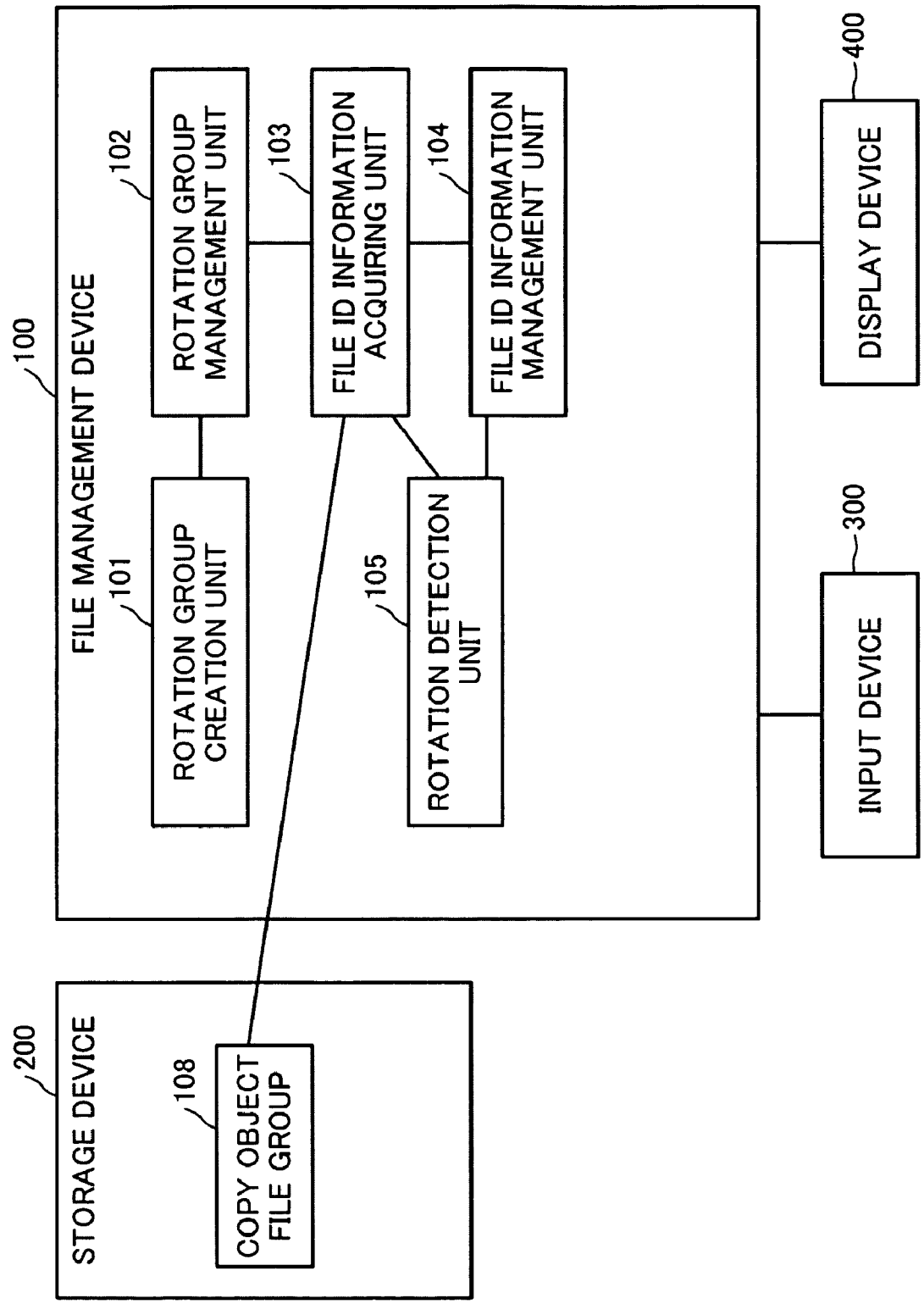

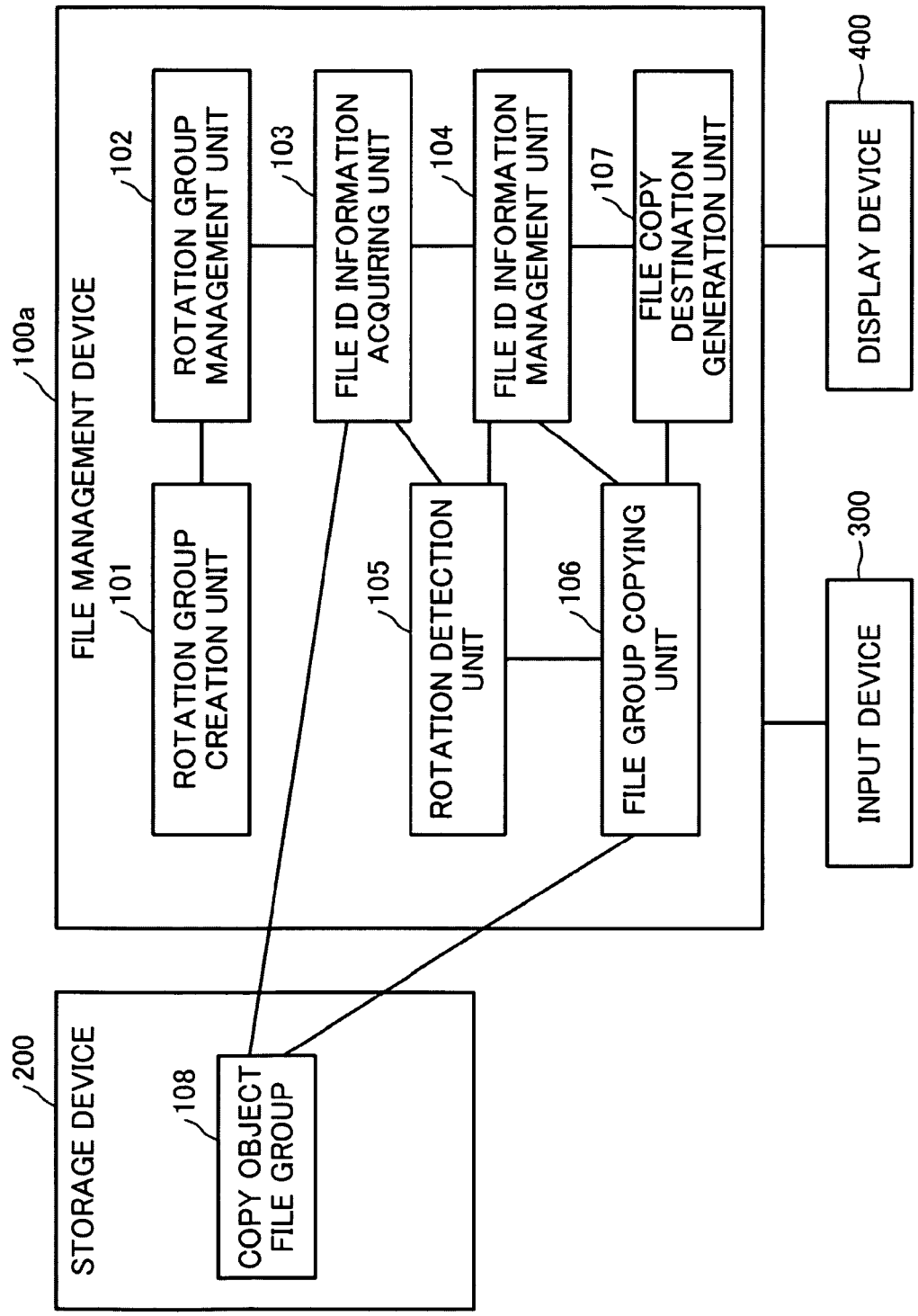

FIG.3

| ROTATION GROUP | FILE PATH | FILE ID INFORMATION (1) | FILE ID INFORMATION (2) | FILE ID INFORMATION (3) | FILE ID INFORMATION (4) |
|---|---|---|---|---|---|
| syslog | /var/adm/syslog/syslog.log | FILE PATH | i-node | | |
| syslog | /var/adm/syslog/OLDsyslog.log | FILE PATH | i-node | | |
| messages | /var/log/messages | FILE PATH | i-node | | |
| messages | /var/log/messages.? | FILE PATH | | | |
| Apache access | C:¥Apache2.2¥logs¥access_log | FILE PATH | UPDATE DATE/TIME | CURRENT TIME | FILE DATA |
| Apache access | C:¥Apache2.2¥logs¥access_log.? | FILE PATH | UPDATE DATE/TIME | CURRENT TIME | FILE DATA |

FIG.4

| FILE ID INFORMATION (FILE PATH) | FILE ID INFORMATION (i-node) | FILE ID INFORMATION (UPDATE DATE/TIME) | FILE ID INFORMATION (CURRENT TIME) | FILE ID INFORMATION (FILE DATA) |
|---|---|---|---|---|
| /var/adm/syslog/OLDsyslog.log | 40728 | | | |
| /var/adm/syslog/syslog.log | 40751 | | | |

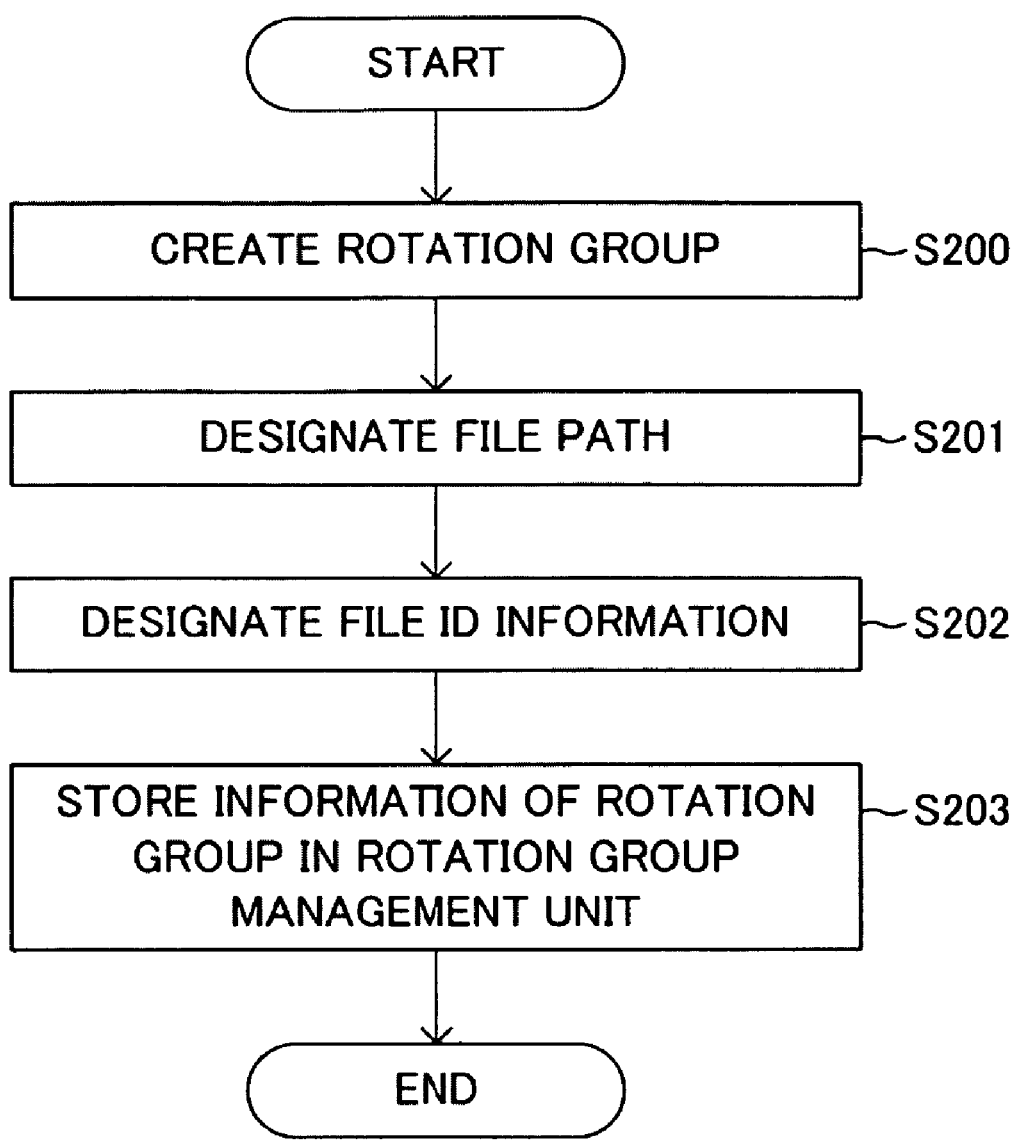

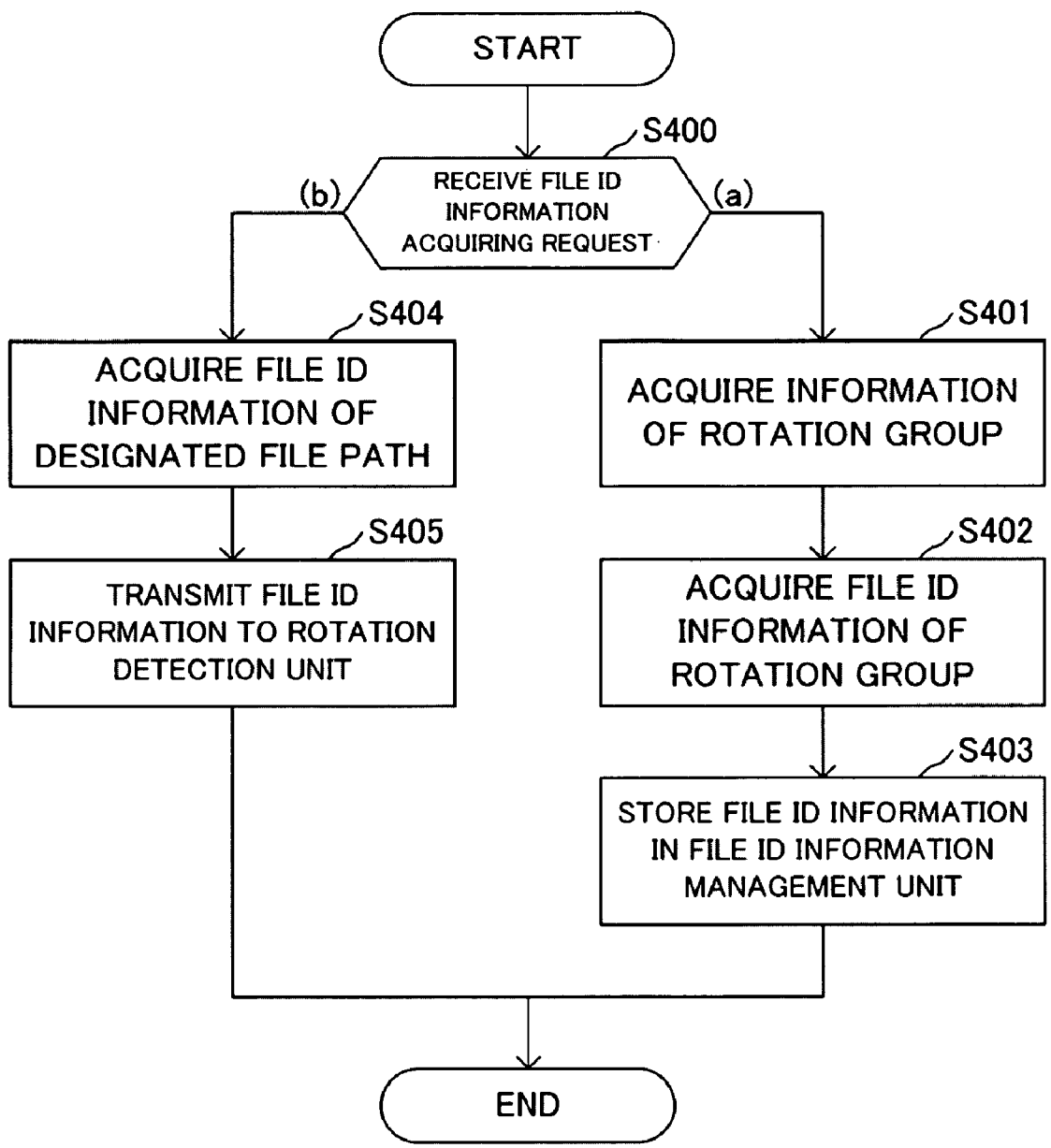

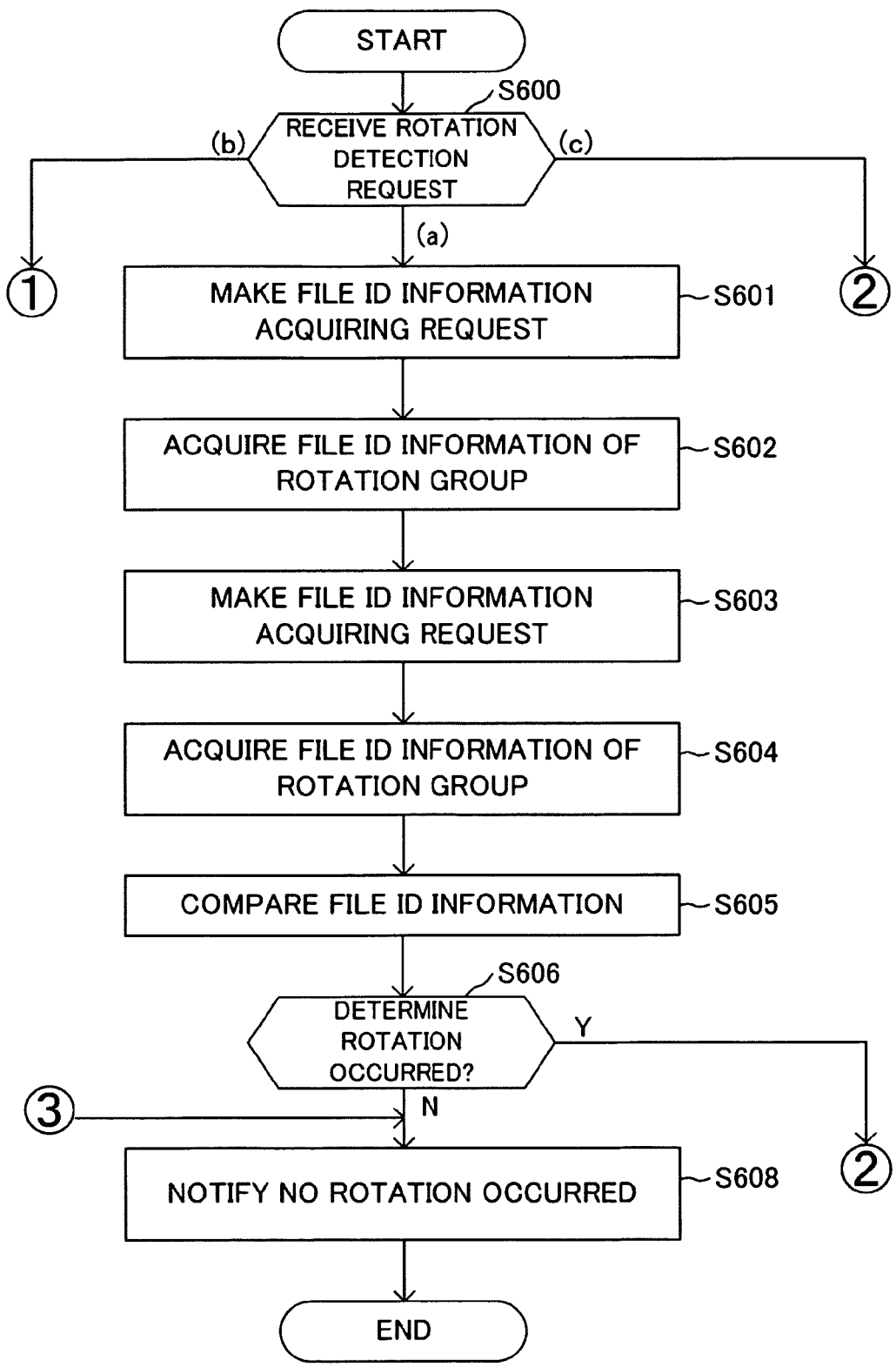

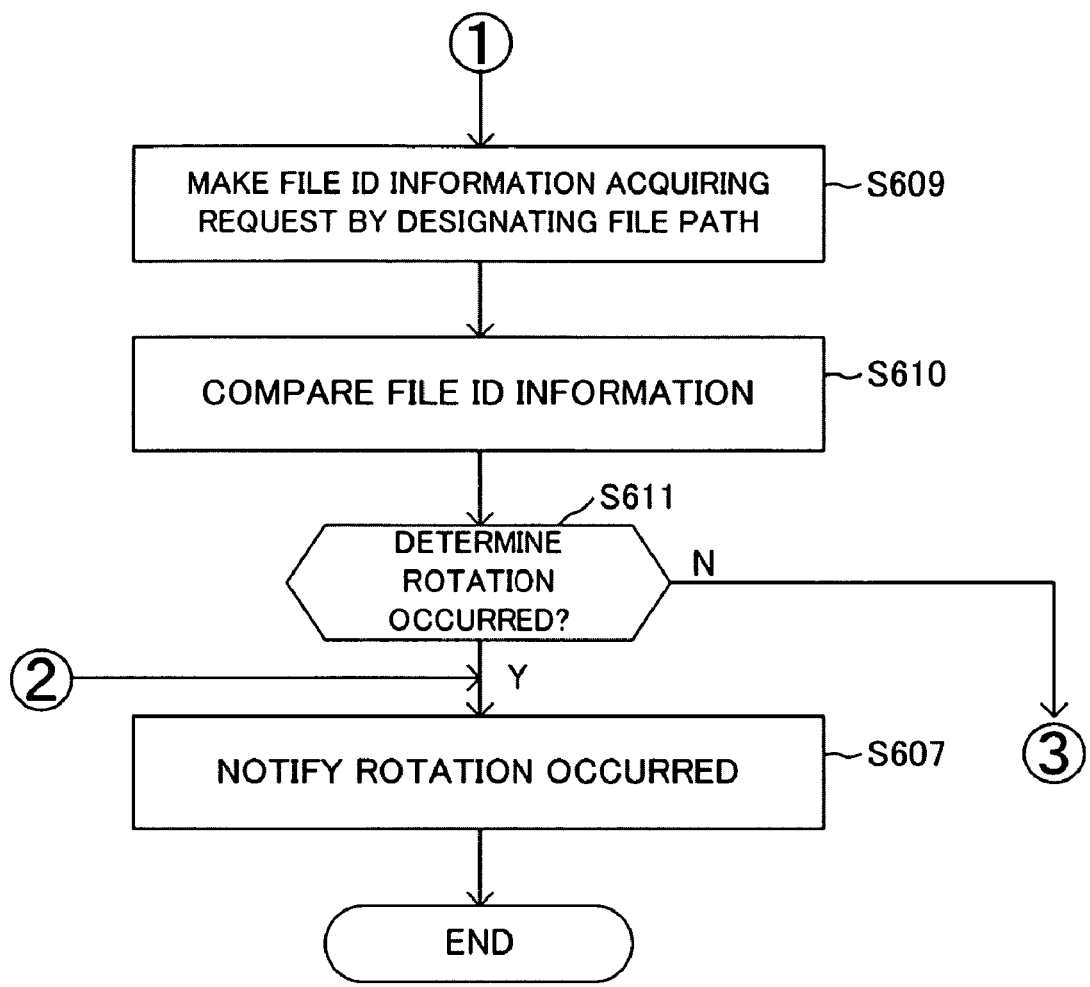

FILE MANAGEMENT METHOD, FILE MANAGEMENT DEVICE, AND PROGRAM

INCORPORATION BY REFERENCE

This application is based upon and claims the benefit of priority from Japanese patent application No. 2008-012444, filed on Jan. 23, 2008, the disclosure of which is incorporated herein in its entirety by reference.

TECHNICAL FIELD

The present invention relates to a file management method, and in particular, to a file management device for managing a group of a plurality of files. Further, the present invention relates to a file management method and program.

BACKGROUND ART

As a means for detecting file migration, Japanese Patent Laid-Open Publication No. 2005-010950 (Patent Document 1) discloses a file management device. This file management device creates a content list file for managing the logical structure of a group of content files, and detects migration of respective content files based on the registered information on the content list file.

Further, as a means for managing a group of files in which the generations thereof are managed, Japanese Patent Laid-Open Publication No. 10-293711 (Patent Document 2) discloses a master file generation management device. In this device, each file has applicable period information indicating the application start date and the application end date. Thereby, master file data in multiple generations having the same file name is managed.

[Patent Document 1] JP 2005-010950 A
[Patent Document 2] JP 10-293711 A

However, the art disclosed in Patent Documents 1 and 2 involves the following problems. In the file management device disclosed in Patent Document 1, as a range of detecting file migration is limited to the same file name, if the file name of a migrated file is changed from the file name before migration, it is handled as a different file. As such, in the case where a file name is changed when an event occurs and a new file is created with the same file name as that before the change (that is, rotation) such as the case of system logs of Linux (registered trademark), file migration cannot be detected. Accordingly, in the file management device of Patent Document 1, in the case of copying a group of files in which the generations thereof are managed by changes in the file names as described above, if rotation of files occurs during the copying, a problem will be caused in the copying process of the file group. As such, in the file management device of Patent Document 1, there have been cases where proper file management cannot be realized, including, the same file being copied for a plurality of times with different file names and some files remaining uncopied.

On the other hand, in the master file generation management device disclosed in Patent Document 2, a file group which is an object of generation management is a group of files having the same file name. Accordingly, there has been a problem that a file group including a plurality of files having different file names cannot be managed properly, so that rotation in such a file group cannot be detected. Further, as it is necessary to include applicable period information in respective files in order to manage the files, some files may not be managed. As such, this device lacks versatility.

SUMMARY

Therefore, an exemplary object of the present invention is to properly manage a group of files in which the generations thereof are managed by changes in the file names, and to improve the versatility of file management.

In order to achieve the object, a file management method according to an exemplary aspect of the invention includes creating a rotation group by grouping a file group in which the generations of the files are managed by changes in the file names, and storing information of the rotation group in a rotation group management unit; acquiring file identification information of the files belonging to the rotation group from the file group according to the information of the rotation group, and storing the file identification information in a file identification information management unit; and acquiring file identification information of the rotation group from the file identification information management unit, further acquiring file identification information of the files belonging to the rotation group from the file group according to the information of the rotation group, and comparing the file identification information further acquired from the file group with the file identification information acquired from the file identification information management unit.

A file management device according to another exemplary aspect of the invention includes a rotation group creation unit which creates a rotation group by grouping a file group in which the generations of the files are managed by changes in the file names; a rotation group management unit which stores information of the rotation group; a file identification information acquiring unit which acquires file identification information of files belonging to the rotation group from the file group according to the information of the rotation group; a file identification information management unit which stores the file identification information acquired by the file identification information acquiring unit; and a comparison unit which acquires file identification information of the rotation group from the file identification information management unit, further acquires file identification information of the files belonging to the rotation group from the file group according to the information of the rotation group, and compares the file identification information further acquired from the file group with the file identification information acquired from the file identification information management unit.

Further, a file management program according to another exemplary aspect of the invention causes a computer to perform functions of creating a rotation group by grouping a file group in which the generations of the files are managed by changes in the file names, and storing information of the rotation group in a rotation group management unit; acquiring file identification information of the files belonging to the rotation group from the file group according to the information of the rotation group, and storing the file identification information in a file identification information management unit; and acquiring file identification information of the rotation group from the file identification information management unit, further acquiring file identification information of the files belonging to the rotation group from the file group according to the information of the rotation group, and comparing the file identification information further acquired from the file group with the file identification information acquired from the file identification information management unit.

As the present invention is configured as described above, it is possible to properly manage a file group in which the generations of the files are managed by changes in the file names, and to improve the versatility of file group management.

BRIEF DESCRIPTION OF THE DRAWINGS

FIG. 1 is a block diagram showing the configuration of a file management device according to a first exemplary embodiment of the present invention;

FIG. 2 is a block diagram showing the configuration of a file management device according to a second exemplary embodiment of the present invention;

FIG. 3 is a table showing exemplary information managed by a rotation group management unit according to the second exemplary embodiment of the present invention;

FIG. 4 is a table showing exemplary information managed by a file identification information management unit according to the second exemplary embodiment of the present invention;

FIG. 5 is a flowchart showing operation of a rotation group creation unit according to the second exemplary embodiment of the present invention;

FIG. 6 is a flowchart showing operation of a file identification information management unit according to the second exemplary embodiment of the present invention;

FIG. 7A is a flowchart showing operation of a rotation detection unit according to the second exemplary embodiment of the present invention;

FIG. 7B is a flowchart showing operation of the rotation detection unit according to the second exemplary embodiment of the present invention;

EXEMPLARY EMBODIMENTS

First Exemplary Embodiment

Figure 8A:
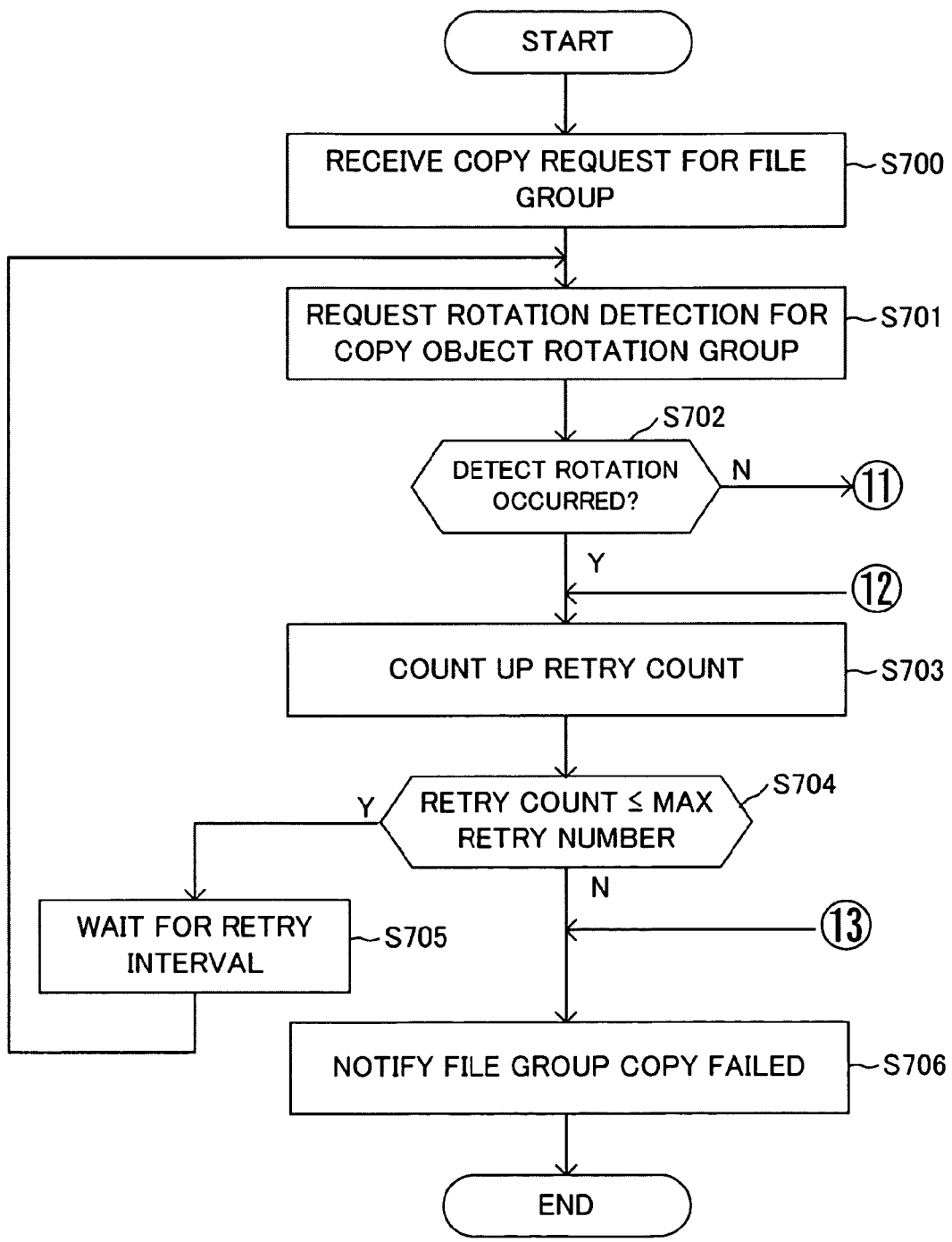
FIG. 8A is a flowchart showing operation of a file group copying unit according to the second exemplary embodiment of the present invention.

A first exemplary embodiment of the present invention will be described with reference to FIG. 1. FIG. 1 is a function block diagram showing the configuration of a file management device according to the first exemplary embodiment of the present invention. In the present embodiment, the overall structure of the file management device will be described.

As shown in FIG. 1, a file management device 100 is connected to a storage device which stores a file group 108 to be copied in which the generations of the files are managed by changes in the file names. The file management device 100 is also connected to an input device 300 to be used by a user to give instructions to the file management device 100, and to a display device 400 for giving notifications from the file management device 100 to the user.

Further, as shown in FIG. 1, the file management device 100 includes a rotation group creation unit 101, a rotation group management unit 102, a file identification information acquiring unit 103, a file identification information management unit 104, and a rotation detection unit 105.

In the file management device 100 having the above configuration, first, the rotation group creation unit 101 creates rotation groups by grouping the copy object file group 108 stored in the storage device 200. Then, the rotation group management unit 102 stores information of each rotation group created by the rotation group creation unit 101 therein.

Further, the file identification information acquiring unit 103 acquires file identification information of files corresponding to the information of the rotation group from the copy object file group 108 stored in the storage device 200. Then, the file identification information management unit 104 stores the file identification information acquired by the file identification information acquiring unit 103 as described above.

Further, the rotation detection unit 105 (comparison unit) acquires file identification information of the rotation group from the file identification information management unit 104. The rotation detection unit 105 further acquires file identification information of the files belonging to the rotation group from the copy object file group 108. Then, the rotation detection unit 105 compares the file identification information acquired from the file group with the file identification information acquired from the file identification information management unit 104. Further, according to the comparison result of the file identification information, the rotation detection unit 105 detects whether or not rotation, in which a new file is created with the same file name, occurred in the copy object file group 108.

As described above, in the present embodiment, rotation groups are created by grouping a group of files, and information of each rotation group is stored in the rotation group management unit 102. Thereby, files of different names can belong to the same group. As such, even for a file group such as system logs of FreeBSD in which the generations thereof are managed by changes in the file names, pieces of file identification information of respective files which are temporarily different can be compared, whereby rotation occurred in the file group can be detected. Consequently, file management having high versatility can be properly realized without using special information disclosed in the above-described Patent Documents.

It should be noted that the file management device 100 may be configured such that when the rotation group creation unit 101 receives designation of file paths and designation of types of file identification information of the files belonging to the rotation group, the rotation group creation unit 101 stores information of the designated file paths and types of the file identification information, as information of the rotation group.

In the file management device 100, the file identification information is at least one of a file path, file size, file creation date and time, file update date and time, i-node (object identifier), current time, and file data, for example.

Further, the file management device 100 may include a file group copying unit which, upon receiving a copy request in rotation group units, copies the copy object rotation group to the copy destination, and during the copying process, causes the rotation detection unit 105 to operate. The file group copying unit may be configured as to retry file copying if the rotation is detected by the rotation detection unit 105 operated by the file group copying unit. Further, the file group copying unit may operate the rotation detection unit 105 after copying of the files belonging to the rotation group is performed successfully. Further, the file identification information acquiring unit 103 preferably operates before the file group copying unit is operated.

It should be noted that the above-described operation of the file management device is realized by a file management program being installed in the file management device.

It should also be noted that the present invention is not limited to the above embodiment.

Second Exemplary Embodiment

Next, the configuration of a second exemplary embodiment of the present invention will be described in detail with reference to the drawings. FIG. 2 is a block diagram showing the configuration of a file management device according to the second exemplary embodiment of the present invention. This embodiment describes the first exemplary embodiment more specifically.

As shown in FIG. 2, a file management device 100a of the present embodiment includes the rotation group creation unit 101, the rotation group management unit 102, the file identification information acquiring unit 103, the file identification information management unit 104, and the rotation detection unit 105, which are the same as the first exemplary embodiment. In addition, the file management device 100a also includes a file group copying unit 106, and a file copy destination generation unit 107.

The units 101 to 107 shown in FIG. 2 have functions as described below, respectively. The rotation group creation unit 101 creates information for grouping a copy object file group 108 into rotation groups, information required as file identification information, and control information (maximum number of retries, retry intervals) for retrying file copying, according to designation by a user. Then, the rotation group creation unit 101 stores the generated information in the rotation group management unit 102.

The rotation group management unit 102 stores and manages information transmitted from the rotation group creation unit 101. FIG. 3 shows exemplary information managed by the rotation group management unit 102. As shown in FIG. 3, the rotation group management unit 102 stores and manages names of rotation groups, file paths, information which designates types of file identification information, and other information.

In FIG. 3, "file path" in a field of "file identification information (1)" indicates that file path data is used as file identification information. In "file identification information (2)", "i-node" indicates that i-node data (object identifier) is used as file identification information, and "updated date/time" indicates that file update date and time data is used as file identification information. Further, "current time" in "file identification information (3)" indicates that current time data is used as file identification information. Further, "file data" in "file identification information (4)" indicates that file data is used as file identification information.

The file identification information acquiring unit 103 has a function of acquiring information of rotation groups. The file identification information acquiring unit 103 also has a function of acquiring a list of file paths corresponding to information of rotation groups from the copy object file group 108, and file identification information of the files designated by those file paths. Further, the file identification information acquiring unit 103 has a function of storing a list of the file paths acquired as described above and file identification information of the respective files, in the file identification information management unit 104. Furthermore, the file identification information acquiring unit 103 has a function of acquiring file identification information of files of designated file paths from the copy object file group 108.

The file identification information management unit 104 stores a list of file paths and file identification information of files transmitted from the file identification information acquiring unit 103. The file identification information management unit 104 stores a plurality of sets of file paths and file identification information. FIG. 4 shows exemplary information managed by the file identification information management unit 104.

The rotation detection unit 105 has a function of making a file identification information acquiring request to the file identification information acquiring unit 103 and a function of acquiring a list of file paths and file identification information of files designated by the file paths. The rotation detection section 105 also has a function of acquiring file identification information of files by designating the file paths. Further, the rotation detection unit 105 has a function of detecting rotation by comparing the acquired pieces of file identification information, and a function of notifying detection of the rotation.

The file group copying unit 106 has a function of acquiring file paths of a rotation group and control information for retrying copying of files from the file identification information management unit 104, and a function of acquiring a file path to a copy destination from the file copy destination generation unit 107. The file group copying unit 106 also has a function of acquiring information to be copied from the copy object file group 108, and a function of copying the information acquired from the copy object file group 108. Further, the file group copying unit 106 has a function of making a rotation detection request to the rotation detection unit 105, and a function of retrying according to control information for retrying the copying process when rotation is detected.

The file copying destination generation unit 107 has a function of acquiring information of a rotation group from the file identification information management unit 104, and generating a path to a copy destination.

It should be noted that a "rotation group" described above indicates a set of log files, in which the generations of files are managed by changes in the file names, such as system logs of Linux. For example, files in which the file paths are "/var/log/message", "/var/log/message.1", "/var/log/message.2", - - - "/var/log/message.9", respectively, are files belonging to the same rotation group. In these files, the generations are newer as the number following "message" becomes larger. Further, these files are in a different rotation group from the files having file paths "/var/log/secure", "/var/log/secure.1", "/var/log/secure.2", - - - "/var/log/secure.9". It should be noted that the files belonging to one "rotation group" are not limited to a group of files having different numbers in the file names as described above.

Figure 8B:
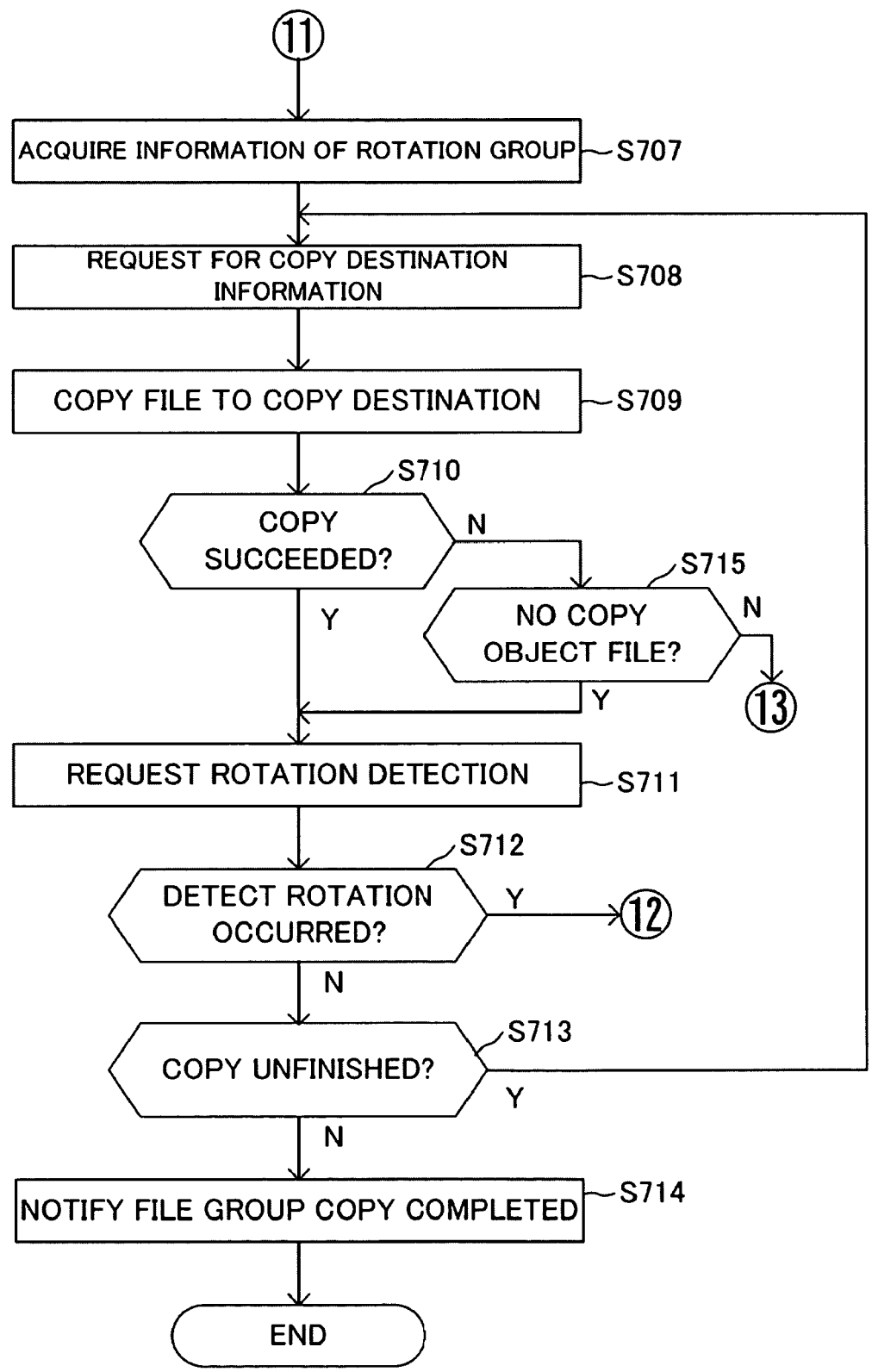
FIG. 8B is a flowchart showing operation of the file group copying unit according to the second exemplary embodiment of the present invention.
Figure 9:
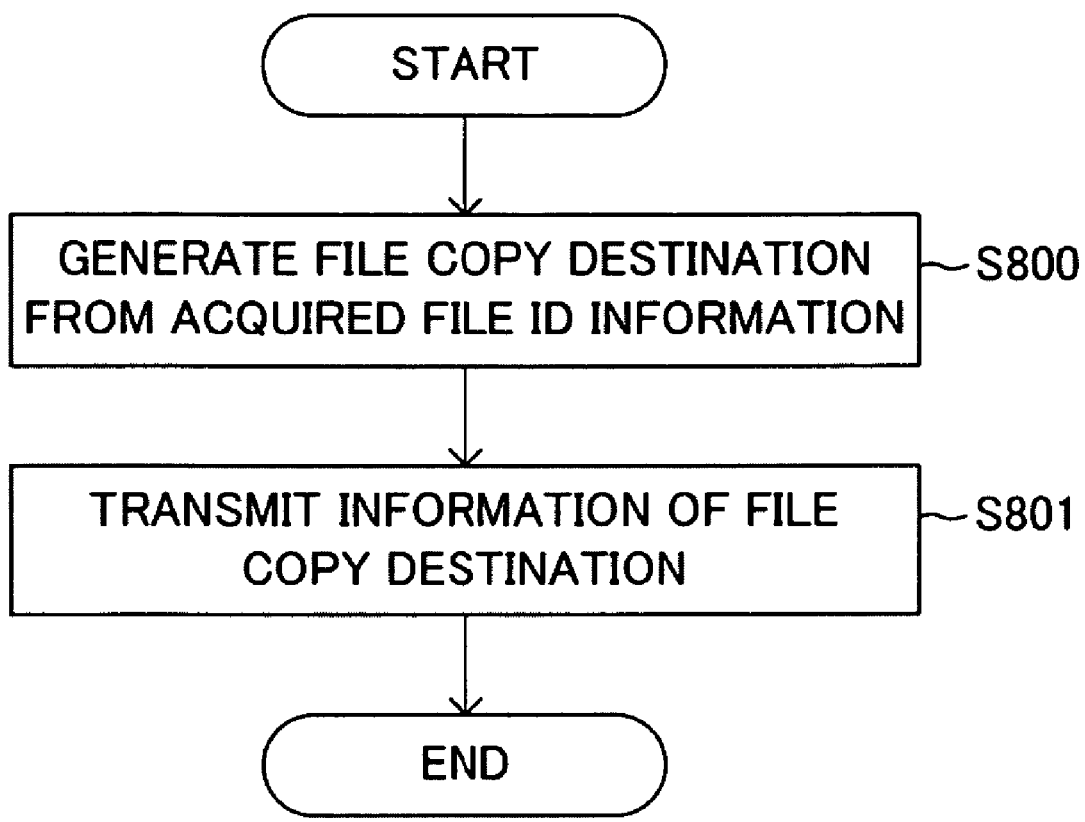
FIG. 9 is a flowchart showing operation of a file copy destination generation unit according to the second exemplary embodiment of the present invention.

Next, operation of the present embodiment will be described in detail. FIG. 5 is a flowchart showing operation of the rotation group creation unit 101. FIG. 6 is a flowchart showing operation of the file identification information acquiring unit 103. FIGS. 7A and 7B are flowcharts showing operation of the rotation detection unit 105. FIGS. 8A and 8B are flowcharts showing operation of the file group copying unit 106. FIG. 9 is a flowchart showing operation of the file copy destination generation unit 107.

First, the rotation group creation unit 101 creates rotation groups according to designation by a user in order to group the copy object file group 108 into rotation groups (FIG. 5: step S200). In this embodiment, it is assumed that a rotation group called "syslog" is designated by the user.

Next, the rotation group creation unit 101 receives designation of file paths of files belonging to the rotation group created in the step S200 from the user (FIG. 5, step S201). A plurality of file paths can be designated, and wildcards and regular expressions can also be used. In this embodiment, "/var/adm/syslog/syslog.log" and "/var/adm/syslog/OLDsyslog.log" are designated as file paths by the user.

The rotation group creation unit 101 also receives designation of file identification information of the files belonging to the rotation group created in the step S200 from the user (FIG. 5, step S202). As the file identification information, a file path, file size, file creation date and time, file update date and time, i-node (object identifier), current time, and file data may be used. In this embodiment, a file path and i-node are designated by the user as the types of information used as the file identification information.

Upon receiving a notification from the user that creation of the rotation group has been completed, the rotation group creation unit 101 stores the information (rotation group name, file paths, file identification information) of the created rotation group in the rotation management unit 102 (FIG. 5, step S203). In this embodiment, only one rotation group called "syslog" is created, as described above.

When the rotation group is created as described above, the file management device 100*a* is able to copy a copy object file group 108 and detect rotation, which will be described below.

Then, when the file group copying unit 106 receives a copy request for a file group from the user (FIG. 8A, step S700), the file group copying unit 106 makes a rotation detection request for the entire rotation group of the copy object to the rotation detection unit 105 (FIG. 8A, step S701). In this embodiment, the file group copying unit 106 receives a copy request for the rotation group "syslog".

When the rotation detection unit 105 receives the rotation detection request from the file group copying unit 106 (FIG. 7A, step S600), the rotation detection unit 105 first determines whether this request is a rotation detection request for the entire rotation group. If the rotation detection request is a detection request for the entire rotation group (FIG. 7A, step S600(*a*)), the rotation detection unit 105 makes a file identification information acquiring request to the file identification information acquiring unit 103 (FIG. 7A, step S601). In this embodiment, the rotation detection unit 105 receives a rotation detection request for the rotation group "syslog" from the file group copying unit 106, and makes a file identification information acquiring request for the rotation group "syslog" to the file identification information acquiring unit 103.

When the file identification information acquiring unit 103 receives the file identification information acquiring request from the rotation detection unit 105 (FIG. 6, step S400), the file identification information creation acquiring unit 103 determines whether or not this request is a file identification information acquiring request for a rotation group. If this request is a file identification information acquiring request for a rotation group (FIG. 6, step S400(*a*)), the file identification information acquiring unit 103 acquires information of a rotation group corresponding to the request, from the rotation group management unit 102 (FIG. 6, step S401). In this embodiment, the file identification information acquiring unit 103 acquires a set of a file path "/var/adm/syslog/syslog.log" and file identification information "file path" and "i-node", and a set of a file path "/var/adm/syslog/OLDsyslog.log" and file identification information "file path" and "i-node", as information of the rotation group "syslog". It should be noted that the file identification information "file path" is not a specific value of a file path but an indication that a file path is used as file identification information. Similarly, file identification information "i-node" is not a specific value of i-node but an indication that i-node is used as file identification information.

Upon acquiring the information of the rotation group, the file identification information acquiring unit 103 acquires file identification information corresponding to this information of the rotation group, from the copy object file group 108 (FIG. 6, step S402), and stores the acquired file identification information in the file identification information management unit 104 (FIG. 6, step S403). In this embodiment, the file identification information acquiring unit 103 acquires a set of a file path "/var/adm/syslog/OLDsyslog.log" and i-node "40728" and a set of a file path "/var/adm/syslog/sysgol.log" and i-node "40751", as the file identification information.

Then, the rotation detection unit 105 acquires file identification information of the rotation group from the file identification information management unit 104 (FIG. 7A, step S602). Further, the rotation detection unit 105 makes a file identification information acquiring request to the file identification information acquiring unit 103 (FIG. 7A, step S603). That is, the rotation detection unit 105 first acquires a set of a file path "/var/adm/syslog/OLDsyslog.log" and i-node "40728" and a set of a file path "/var/adm/syslog/syslog.log" and i-node "40751" as the file identification information (FIG. 7A, step S602), and makes a file identification information acquiring request for the rotation group "syslog" again (FIG. 7A, step S603). It should be noted that although the expected effects can be achieved without performing the processes of the steps S602 and S603 in FIG. 7A and the steps S604 and S605 in FIG. 7A described below, those processes are performed in the present embodiment. In the case where those processes are not performed, a determination result in the step S606 of FIG. 7A, described below, will be "no rotation occurred".

Then, when the file identification information acquiring unit 103 receives the file identification information acquiring request from the rotation detection unit 105, if this request is a file identification information acquiring request for a rotation group (FIG. 6, step S400(*a*)), the file identification information acquiring unit 103 acquires information of the rotation group corresponding to the request, from the rotation group management unit 102 (FIG. 6, step S401). In this embodiment, the file identification information acquiring unit 103 acquires a set of a file path "/var/adm/syslog/syslog.log" and file identification information "file path" and "i-node", and a set of a file path "/var/adm/syslog/OLDsyslog.log" and file identification information "file path" and "i-node", as information of the rotation group "syslog".

Upon acquiring the information of the rotation group, the file identification information acquiring unit 103 acquires file identification information corresponding to the information of the rotation group from the copy object file group 108 (FIG. 6, step S402), and stores the acquired file identification information in the file identification information management unit 104 (FIG. 6, step S403). In this embodiment, it is assumed that rotation occurred before the file identification information is acquired in the step S402, and the file path "/var/adm/syslog/OLDsyslog.log" is deleted, the file path "/var/adm/syslog/syslog.log" is rewritten to "/var/adm/syslog/OLDsyslog.log", and a new file path "/var/adm/syslog/syslog.log" is created. Here, the file identification information acquiring unit 103 acquires and stores a set of the file path "/var/adm/syslog/OLDsyslog.log" and i-node "40751", and a set of the file path "/var/adm/syslog/syslog.log" and i-node "40786", as file identification information.

Then, the rotation detection unit 105 acquires the file identification information of the rotation group from the file identification information acquiring unit 104 (FIG. 7A, step S604), and compares the acquired file identification information with the file identification information acquired in the step S603 of FIG. 7A (FIG. 7A, step S605). In this embodiment, the rotation detection unit 105 acquires a set of a file path "/var/adm/syslog/OLDsyslog.log" and i-node "40751" and a set of a file path "/var/adm/syslog/syslog.log" and i-node "40786" as file identification information, and compares this file identification information with the file identification information acquired in the step S602 in FIG. 7A (FIG. 7A, step S605).

In this case, as a result of comparing the respective pieces of file identification information, the rotation detection unit 10 determines that the combinations of the file paths and i-node are different. As such, the rotation detection unit 105 determines that rotation occurred in the copy object file group 108 (FIG. 7A, step S606, Y). When the rotation detection unit 105 determines that rotation occurred, the rotation detection unit 105 notifies the file group copying unit 106 that rotation occurred (FIG. 7B, step S607).

When the file group copying unit 106 receives a notification that rotation occurred from the rotation detection unit 105 (FIG. 8A, step S702, Y), the file group copying unit 106 counts up the retry count value for counting the number of retries of copying. Then, the file group copying unit 106 determines whether the retry count value after the count-up is the maximum number of retries or less (FIG. 8A, step S704). If the retry count value is the maximum number of retries or less (FIG. 8A, step S704, Y), the file group copying unit 106 waits for a predetermined retry interval (FIG. 8A, step S705). In this embodiment, the maximum number of retries is set to "2", and the retry count value is counted up from "0" to "1" (FIG. 8A, step S703). Further, as the retry interval is set to "two seconds", the file group copying unit 106 waits for two seconds and restart the process (FIG. 8A, step S705).

If the retry count value after the count-up in the step S703 of FIG. 8A is larger than the maximum number of retries (FIG. 8A, step S704, N), the file group copying unit 106 notifies the user that copying of the file group of the rotation group is performed unsuccessfully (FIG. 8A, step S706). Then, the file group copying unit 106 terminates the copying process.

If the retry count value is the maximum number of retries or less, the file group copying unit 106 waits for the retry interval (FIG. 8A, step S705), and then makes a rotation detection request for the entire rotation group of the copy object to the rotation detection unit 105 (FIG. 8A, step S701). In this embodiment, the file group copying unit 106 makes a rotation detection request for the rotation group "syslog".

When the rotation detection unit 105 receives the rotation detection request, if this request is a rotation detection request for the entire rotation group (FIG. 7A, step S600(a)), the rotation detection unit 105 makes a file identification information acquiring request to the file identification information acquiring unit 103 (FIG. 7A, step S601). In this embodiment, the rotation detection unit 105 receives a rotation detection request for the rotation group "syslog" from the file group copying unit 106, and makes a file identification information acquiring request for the rotation group "syslog" to the file identification information acquiring unit 103.

When the file identification information acquiring unit 103 receives the file identification information acquiring request from the rotation detection unit 105, if this request is a file identification information acquiring request for the rotation group (FIG. 6, step 400(a)), the file identification information acquiring unit 103 acquires information of the rotation group corresponding to the request, from the rotation group management unit 102 (FIG. 6, step S401). In this embodiment, the file identification information acquiring unit 103 acquires a set of a file path "/var/adm/syslog/syslog.log" and file identification information "file path" and "i-node", and a set of a file path "/var/adm/syslog/OLDsyslog.log" and file identification information "file path" and "i-node", as information of the rotation group "syslog".

Upon acquiring the information of the rotation group, the file identification information acquiring unit 103 acquires file identification information corresponding to the information of the rotation group from the copy object file group 108 (FIG. 6, step S402), and stores the acquired file identification information in the file identification information management unit 104 (FIG. 6, step S403). In this embodiment, the file identification information acquiring unit 103 acquires and stores a set of a file path "/var/adm/syslog/OLDsyslog.log" and i-node "40751", and a set of a file path "/var/adm/syslog/syslog.log" and i-node "40786".

Then, the rotation detection unit 105 acquires file identification information of the rotation group from the file identification information management unit 104 (FIG. 7A, step S602). Further, the rotation detection unit 105 makes a file identification information acquiring request to the file identification information acquiring unit 103 (FIG. 7A, step S603).

When the file identification information acquiring unit 103 receives the file identification information acquiring request from the rotation detection unit 105, if this request is a file identification information acquiring request for a rotation group (FIG. 6, step S400(a)), the file identification information acquiring unit 103 acquires information of the rotation group corresponding to the request, from the rotation group management unit 102 (FIG. 6, step S401). In this embodiment, the file identification information acquiring unit 103 acquires a set of a file path "/var/adm/syslog/syslog.log" and file identification information "file path" and "i-node", and a set of a file path "/var/adm/syslog/OLDsyslog.log" and file identification information "file path" and "i-node", as information of the rotation group "syslog".

When the file identification information acquiring unit 103 acquires the information of the rotation group, the file identification information acquiring unit 103 acquires file identification information corresponding to the information of the rotation group from the copy object file group 108 (FIG. 6, step S402), and stores the acquired file identification information in the file identification information management unit 104 (FIG. 6, step S403). In this embodiment, the file identification information acquiring unit 103 acquires and stores a set of a file path "/var/adm/syslog/OLDsyslog.log" and i-node "40751", and a set of a file path "/var/adm/syslog/syslog.log" and i-node "40786", as the file identification information.

Then, the rotation detection unit 105 acquires file identification information of the rotation group from the file identification information management unit 104 (FIG. 7A, step S604), and compares the file identification information acquired in the step S602 of FIG. 7A with the file identification information acquired in the step S604 of FIG. 7A (FIG. 7A, step S605). In this embodiment, the rotation detection unit 105 acquires a set of a file path "/var/adm/syslog/OLDsyslog.log" and i-node "40751", and a set of a file path "/var/adm/syslog/syslog.log" and i-node "40786", as the file identification information (FIG. 7A, step S604), and compares the file identification information acquired in the step S602 of FIG. 7A, that is, a set of a file path "/var/adm/syslog/OLDsyslog.log" and i-node "40751", with a set of a file path "/var/adm/syslog/syslog.log" and i-node "40786".

As the combinations of the file paths and i-node coincide in the comparison described above, the rotation detection unit 105 determines that no rotation occurred (FIG. 7A, S606, N).

Then, the rotation detection unit 105 notifies the file group copying unit 106 that no rotation occurred (FIG. 7A, step S608).

When the file group copying unit 106 is notified from the rotation detection unit 105 that no rotation occurred (FIG. 8A, step S702, N), the file group copying unit 106 acquires file identification information of the rotation group from the file identification management unit 104 (FIG. 8B, step S707). In this embodiment, the rotation detection unit 105 acquires a set of a file path "/var/adm/syslog/OLDsyslog.log" and i-node "40571", and a set of a file path "/var/adm/syslog/syslog.log" and i-node "40786", as the file identification information.

Upon acquiring the file identification information, the file group copying unit 106 requests the file copy destination generation unit 107 for copy destination information of the file identification information (FIG. 8A, step S708). In this embodiment, the file group copying unit 106 requests for copy destination information of a set of a file path "/var/adm/syslog/OLDsyslog.log" and i-node "40751".

Then, the file copy destination generation unit 107 extracts the file identification information from the request made by the file group copying unit 106, generates file copy destination information of the file identification information (FIG. 9, step S800), and transmits the generated file copy destination information to the file group copying unit 106 (FIG. 9, step S801). In this embodiment, the file copy destination generation unit 107 generates a copy destination file path "/tmp/copy_file_000001" and a write destination file path "/tmp/copy_tmp/map_file_000001" for other information, as file copy destination information. The other information includes a file path of the copy origin, file update date and time, i-node, file creation date and time, and a file size, which are stored while being associated with the copy destination file.

When the file group copying unit 106 acquires the file copy destination information from the file copy destination generation unit 107, the file group copying unit 106 copies the copy object file to the copy destination designated in the information (FIG. 8B, step S709). In this embodiment, the file group copying unit 106 copies a file of the file path "/var/adm/syslog/OLDsyslog.log" to a storage area of the copy destination file path "/tmp/copy_tmp/copy_file_000001". Further, the file group copying unit 106 stores the file path of the copy origin "/var/adm/syslog/OLDsyslog.log", file update date and time, i-node, file creation date and time, and file size in the storage area of the file path "/tmp/copy_tmp/map_file_00001" in the form of being associated with the file of the file path "/tmp/copy_tmp/copy_file_00001". In this embodiment, it is assumed that the copying is performed successfully.

Then, the file group copying unit 106 determines whether or not the copying has been performed successfully (FIG. 8B, step S710). When the file group copying unit 106 determines that the copying has been performed successfully (FIG. 8B, step S710, Y), the file group copying unit 106 makes a rotation detection request for the file which has been copied successfully, to the rotation detection unit 105 (FIG. 8B, step S711). In this embodiment, the file group copying unit 106 makes a rotation detection request for a file of a file path "/var/adm/syslog/OLDsyslog.log".

When the rotation detection unit 105 receives the rotation detection request, if this request is a rotation detection request for the file which has been copied successfully (FIG. 7A, step S600(b)), the rotation detection unit 105 makes a file identification information acquiring request to the file identification information acquiring unit 103 by designating the file path included in the rotation detection request (FIG. 7B, step S609). In this embodiment, the rotation detection unit 105 makes a file identification information acquiring request for a file path "/var/adm/syslog/OLDsyslog.log".

If the file identification information acquiring request received from the rotation detection unit 105 is a file identification information acquiring request indicating a file path, the file identification information acquiring unit 103 acquires file identification information of the designated file path from the copy object file group 108 (FIG. 6, step S404), and transmits the acquired file identification information to the rotation detection unit 105 (FIG. 6, step S405) In this embodiment, the file identification information acquiring unit 103 acquires i-node "40751" as file identification information corresponding to the designated file path "/var/adm/syslog/OLDsyslog.log".

When the rotation detection unit 105 acquires the file identification information from the file identification information acquiring unit 103, the rotation detection unit 105 compares this file identification information with the file identification information acquired in the step S707 of FIG. 8A (FIG. 7B, step S610). It is assumed that the rotation detection unit 105 has acquired the file identification information which was acquired by the file group copying unit 106 in the step S707 of FIG. 8A, from the file group copying unit. In this embodiment, the set of a file path "/var/adm/syslo/OLDsyslog.log" and i-node "40751" acquired in the step S610 and the set of a file path "/var/adm/syslog/OLDsyslog.log" and i-node "40751" acquired in the step S707 coincide. Accordingly, the rotation detection unit 105 determines that no rotation occurred (FIG. 7B, step S611, N).

When the rotation detection unit 105 determines that no rotation occurred, the rotation detection unit 105 notifies the file group copying unit 106 that no rotation occurred (FIG. 7A, step S608).

When the file group copying unit 106 is notified from the rotation detection unit 105 that no rotation occurred (FIG. 8B, step S712, N), the file group copying unit 106 checks whether there is any file which has not been copied in the copy object rotation group (FIG. 8B, step S713). If there is a file which has not been copied (FIG. 8B, step S713, Y), the file group copying unit 106 requests the copy destination generation unit 107 for copy destination information of this file (FIG. 7B, step S708). In this embodiment, a file of a file path "/var/adm/syslog/syslog.log" remains uncopied in the copy object rotation group "syslog". As such, the file group copying unit 106 requests for copy destination information for a set of a file path "/var/adm/syslog/syslog.log" and i-node "40786".

Then, the file copy destination generation unit 107 extracts the file identification information from the request made by the file group copying unit 106, generates file copy destination information corresponding to the file identification information (FIG. 9, step S800), and transmits the generated file copy destination information to the file group copying unit 106 (FIG. 9, step S801). In this embodiment, a copy destination file path "/tmp/copy_tmp/copy_file_00002" and a write destination file path "/tmp/copy_tmp/map_file_000001" for other information are generated as file copy destination information. The other information includes a file path of the copy origin, file update date and time, i-node, file creation date and time, and file size, which are stored while being associated with the copy destination file.

When the file group copying unit 106 acquires the file copy destination information from the file copy destination generation unit 107, the file group copying unit 106 copies the copy object file to the copy destination designated in this information (FIG. 8B, step S709). In this embodiment, the file group copying unit 106 copies a file of a file path "/var/adm/syslog/syslog.log" to the storage area of the copy destination file path "/tmp/copy_tmp/copy_file_000002". Further, the file group copying unit 106 writes a file path "/var/adm/syslog/syslog.log" of the copy origin, file update date and time, i-node, file creation date and time, and file size, in the storage area of a file path "/tmp/copy_tmp/map_file_000001" in the form of being associated with the file of the file path "/tmp/copy_tmp/copy_file_000002". In this embodiment, it is assumed that the copying is performed successfully.

Then, the file group copying unit 106 determines whether or not the copying has been performed successfully (FIG. 8B, step S710). If the file group copying unit 106 determines that the copying has been performed successfully (FIG. 8B, step S710, Y), the file group copying unit 106 makes a rotation detection request for the file which has been copied successfully, to the rotation detection unit 105 (FIG. 8B, step S711). In this embodiment, the file group copying unit 106 makes a rotation detection request of a file of the file path "/var/adm/syslog/syslog.log".

If the received rotation detection request is a rotation detection request for the file which has been copied successfully (FIG. 7A, step S600(*b*)), the rotation detection unit 105 makes a file identification information acquiring request by designating the file path included in the rotation detection request, to the file identification information acquiring unit 103 (FIG. 7B, step S609). In this embodiment, the rotation detection unit 105 makes a file identification information acquiring request for the file path "/var/adm/syslog/syslog.log".

If the file identification information acquiring request received from the rotation detection unit 105 is a file identification information acquiring request designating a file path (FIG. 6, step S400(*b*)), the file identification information acquiring unit 103 acquires file identification information of the designated file path from the copy object file group 108 (FIG. 6, step S404), and transmits the acquired file identification information to the rotation detection unit 105 (FIG. 6, step S405). In this embodiment, the file identification information acquiring unit 103 acquires i-node "40786" as file identification information corresponding to the designated file path "/var/adm/syslog/syslog.log".

When the rotation detection unit 105 acquires the file identification information from the file identification information acquiring unit 103, the rotation detection unit 105 compares this file identification information with the file identification information acquired in the step S707 of FIG. 8A (FIG. 7B, steps S610, S611). It is assumed that the rotation detection unit 105 has acquired the file identification information acquired by the file group copying unit 106 in the step S707 of FIG. 8A, from the file group copying unit 106. In this embodiment, a set of a file path "/var/adm/syslog/syslog.log" and i-node "40786" acquired in the step S610, and a set of a file path "/var/adm/syslog/syslog.log" and i-node "40786" acquired in the step S707 coincide. Accordingly, the rotation detection unit 105 determines that no rotation occurred (FIG. 7B, step S611, N).

When the rotation detection unit 105 determines that no rotation occurred, the rotation detection unit 105 notifies the file group copying unit 106 that no rotation occurred (FIG. 7A, step S608).

When the file group copying unit 106 is notified from the rotation detection unit 105 that no rotation occurred (FIG. 8B, step S712, N), the file group copying unit 106 checks whether there is any file which has not been copied in the copy object rotation group (FIG. 8B, step S713). If there is no file which has not been copied (FIG. 8B, step S713, N), the file group copying unit 106 notifies the user that copying of the file group of the copy object rotation group has been completed (FIG. 8B, step S714). In this embodiment, the file group copying unit 106 confirms that there is no subsequent file in the rotation group "syslog", and notifies that copying of the file group has been completed. Through these processes, copying of the file group of one rotation group has been completed.

As described above, the effects described in the first exemplary embodiment can be achieved in the present embodiment. As such, by storing information of rotation groups formed by grouping files, an occurrence of rotation can be detected even for the files in which the generations thereof are managed by changes in the file names, whereby proper file management can be achieved.

In particular, as files are identified according to file identification information in the present embodiment, by comparing file identification information before copying with file identification information after copying, an occurrence of rotation can be detected. As such, even if rotation occurs during copying of a file group, a file can be copied without any duplication by retrying the copying process. Thereby, proper file management can be achieved.

Further, in the present embodiment, as the copying process of a file group is performed according to a list of copy objects, if there is a case where a file cannot be accessed during the copying process of the file group, it is possible to determine that rotation occurred. Accordingly, even if rotation occurs during copying of the file group, it is possible to copy the file group continuously by retrying the copying process.

It should be noted that the present invention is not limited to this embodiment.

Third Exemplary Embodiment

Next, a third exemplary embodiment of the present invention will be described with reference to the drawings. This embodiment describes the first exemplary embodiment more specifically. Even in the present embodiment, as the configuration and operation of the file management device 100*a* is the same as those of the second exemplary embodiment, description will be given by using FIGS. 2 to 9.

First, the rotation group creation unit 101 creates rotation groups according to designation by a user in order to group the copy object file group 108 into rotation groups (FIG. 5, step S200). In this embodiment, it is assumed that creation of a rotation group called "message" is designated by a user.

Then, the rotation group creation unit 101 receives designation of file paths of files belonging to the rotation group created in the step S200 from the user (FIG. 5, step S201). A plurality of file paths can be designated, and wildcards and regular expressions may be used. In this embodiment, it is assumed that file paths of "/var/log/messages" and "/var/log/messages.?" are designated by the user.

Then, the rotation group creation unit 101 receives designation of file identification information of files belonging to the rotation group created in the step S200 from the user (FIG. 5, step S202). As file identification information, a file path, file size, file creation date and time, file update date and time, i-node (object identifier), current time, and file data may be used. In this embodiment, a file path and i-node are designated by the user as types of information to be used as file identification information.

When the rotation group creation unit 101 receives a notification from the user that creation of the rotation group has been completed, the rotation group creation unit 101 stores information of the created rotation group in the rotation management unit 102 (FIG. 5, step S203). In this embodiment, only one rotation group called "messages" is created. When the rotation group is created in this way, the file management device 100a is able to copy a copy object file group 108 and detect rotation as described below.

When the file group copying unit 106 receives a copy request for the file group from the user (FIG. 8A, step S700), the file group copying unit 106 makes a rotation detection request for the entire rotation group of the copy object to the rotation detection unit 105 (FIG. 8A, step S701). In this embodiment, the file group copying unit 106 receives a copy request for the rotation group "massages".

When the rotation detection unit 105 receives the rotation detection request, if this request is a rotation detection request for the entire rotation group (FIG. 7A, step S600(a)), the rotation detection unit 105 makes a file identification information acquiring request to the file identification information acquiring unit 103 (FIG. 7A, step S601). In this embodiment, the rotation detection unit 105 receives a rotation detection request for the rotation group "messages" from the file group copying unit 106, and makes a file identification information acquiring request for the rotation group "messages" to the file identification information acquiring unit 103.

When the file identification information acquiring unit 103 receives the file identification information acquiring request from the rotation detection unit 105, if this request is a file identification information acquiring request for the rotation group (FIG. 6, step S400(a)), the file identification information acquiring unit 103 acquires information of the rotation group corresponding to the request, from the rotation group management unit 102 (FIG. 6, step S401). In this embodiment, the file identification information acquiring unit 103 acquires a set of a file path "/var/log/messages" and file identification information "file path" and "i-node", and a set of a file path "/var/log/messages.?" and file identification information "file path" and "i-node", as information of the rotation group "messages".

Upon acquiring the information of the rotation group, the file identification information acquiring unit 103 acquires file identification information corresponding to the information of the rotation group from the copy object file group 108 (FIG. 6, step S402), and stores the acquired file identification information in the file identification information management unit 104 (FIG. 6, step S403). In this embodiment, the file identification information acquiring unit 103 acquires and stores a set of a file path "/var/log/messages" and i-node "51112", and a set of a file path "/var/log/messages.1" and i-node "51133", as file identification information.

Although the rotation detection unit 105 is adapted to perform the processes of the steps S602 to 605 after the step S601 as shown in FIG. 7A, the expected effects can be achieved without performing the processes of the step S602 to S605. Accordingly, the steps S602 to S605 are not performed in the present embodiment. In that case, a determination result of the step S606 will be "no rotation occurred" (FIG. 7A, step S606, N). As such, the rotation detection unit 105 notifies the file group copying unit 106 that no rotation occurred (FIG. 6, step S608).

When the file group copying unit 106 is notified from the rotation detection unit 105 that no rotation occurred (FIG. 8A, step S702, N), the file group copying unit 106 acquires file identification information of the rotation group from the file identification information management unit 104 (FIG. 8B, step S707). In this embodiment, the file group copying unit 106 acquires a set of a file path "/var/log/messages" and i-node "51112", and a set of a file path "/var/log/messages.1" and i-node "51133", as file identification information.

Upon acquiring the file identification information, the file group copying unit 106 requests the file copy destination unit 107 for copy destination information corresponding to this file identification information (FIG. 8B, step S708). In this embodiment, the file group copying unit 106 requests for copy destination information for the set of a file path "/var/log/messages" and i-node "51112".

Then, the file copy destination generation unit 107 extracts the file identification information from the request made by the file group copying unit 106, and generates file copy destination information corresponding to this file identification information (FIG. 9, step S800). Then, the file copy destination unit 107 transmits the generated file copy destination information to the file group copying unit 106 (FIG. 9, step S801). In this embodiment, the file copy destination unit 107 generates a copy destination file path "/tmp/copy_tmp/copy_file_000001" and a write destination file path "/tmp/copy_tmp/map_file_000001" for other information, as file copy destination information. The other information includes a file path of the copy origin, file update date and time, i-node, file creation date and time, and file size, which are stored in the form of being associated with the copy destination file.

When the file group copying unit 106 acquires the file copy destination information from the file copy destination generation unit 107, the file group copying unit 106 copies the copy object file to the copy destination designated in this information (FIG. 8B, step S709). In this embodiment, it is assumed that rotation begins immediately before opening and starting copying the file of the file path "/var/log/messages". Specifically, the file path "/var/log/messages.1" is rewritten into "/var/log/messages.2", and the file path "/var/log/messages" is rewritten into "/var/log/messages.1", and until the time that a file path "/var/log/messages" is created, an attempt to open the file path "/var/log/messages" is executed. As the file path "/var/log/messages" is not present, an attempt to open the file is failed. Then, the file path "/var/log/messages" is created in the continuing rotation process.

Then, the file group copying unit 106 determines whether the copying has been performed successfully (FIG. B, step S710), and if it determines that the copying has not been performed successfully, the file group copying unit 106 further determines whether there is a copy object file (FIG. 8B, step S715). If the file group copying unit 106 determines that copying has not been performed successfully because there is no copy object file (FIG. 8B, step S715, Y), the file group copying unit 106 makes a rotation detection request to the rotation detection unit 105 (FIG. 8B, step S711). In this embodiment, as copying has not been performed successfully because there is no file, the file group copying unit 106 makes a rotation detection request.

If the copying process has not been performed successfully because of a reason other than no file (FIG. 8B, step S715, N), the file group copying unit 106 will not make a rotation detection request, and notifies the user that copying of the file group of the rotation group has not been performed successfully (FIG. 7A, step S706).

When the rotation detection unit 105 receives the rotation detection request, if this request is a rotation detection request made due to copy failure (FIG. 7A, step S600, (c)), the rotation detection unit 105 notifies the file group copying unit 106 that rotation occurred (FIG. 7B, step S607).

When the file group copying unit 106 is notified from the rotation detection unit 105 that rotation occurred (FIG. 8B, step S712, Y), the file group copying unit 106 counts up a retry count value (FIG. 8A, step S703), and determines whether the retry count value after the count-up is the maximum number of retries or less (FIG. 8A, step S704). If the retry count value is the maximum number of retries or less (FIG. 8A, step S704, Y), the file group copying unit 106 waits for a predetermined retry interval (FIG. 8A, step S705). In this embodiment, the maximum number of retries is set to "2", and the retry count value is counted up from "0" to "1" (FIG. 8A, step S703). Further, as the retry interval is set to "two seconds", the file group copying unit 106 waits for two seconds and then restarts the process (FIG. 8A, step S705).

If the retry count value after the count-up is larger than the maximum number of retries (FIG. 8A, step S704, N), the file group copying unit 106 notifies the user that copying of the file group of the rotation group has not been performed successfully (FIG. 8A, step S706), and terminates the copying process.

If the retry count value is the maximum number of retries or less, the file group copying unit 106 waits for the retry interval (FIG. 8A, step S705), and then makes a rotation detection request for the entire rotation group of the copy object to the rotation detection unit 105 (FIG. 8A, step S701). In this embodiment, the file group copying unit 106 makes a rotation detection request for the rotation group "messages".

When the rotation detection unit 105 receives the rotation detection request, if this request is a rotation detection request for the entire rotation group (FIG. 7A, step S600(a)), the rotation detection unit 105 makes a file identification information acquiring request to the file identification information acquiring unit 103 (FIG. 7A, step S601). In this embodiment, the rotation detection unit 105 receives the rotation detection request for the rotation group "messages" and makes a file identification information acquiring request for the rotation group "messages" to the file identification information acquiring unit 103.

When the file identification information acquiring unit 103 receives the file identification information acquiring request from the rotation detection unit 105, if this request is a file identification information acquiring request for the rotation group (FIG. 6, step S400), the file identification information acquiring unit 103 acquires information of the rotation group corresponding to the request, from the rotation group management unit 102 (FIG. 6, step S401). In this embodiment, the file identification information acquiring unit 103 acquires a set of a file path "/var/log/messages" and file identification information "file path" and "i-node", and a set of a file path "/var/log/messages.?" and file identification information "file path" and "i-node", as information of the rotation group "messages".

When the file identification information acquiring unit 103 acquires information of the rotation group, the file identification information acquiring unit 103 acquires file identification information corresponding to the information of the rotation group from the copy object file group 108 (FIG. 6, step S402), and stores the acquired file identification information in the file identification information management unit 104 (FIG. 7, step S403). In this embodiment, the file identification information acquiring unit 103 acquires and stores a set of a file path "/var/log/messages" and i-node "51114", a set of a file path "/var/log/messages.1" and i-node "51112", and a set of a file path "/var/log/messages.2" and i-node "51133".

Although the rotation detection unit 105 is adapted to perform processes of the steps S602 to S605 after the step S601 in FIG. 7A, the steps S602 to S605 are not performed in the present embodiment, as described above. If the steps S602 to S605 are not performed as the case of the present embodiment, a determination result of the step S606 will be "no rotation occurred". Accordingly, the rotation detection unit 105 notifies the file group copying unit 106 that no rotation occurred (FIG. 7A, step S608).

When the file group copying unit 106 is notified from the rotation detection unit 105 that no rotation occurred (FIG. 8A, step S702, N), the file group copying unit 106 acquires file identification information of the rotation group from the file identification information management unit 104 (FIG. 8B, step S707). In this embodiment, the file group copying unit 106 acquires a set of a file path "/var/log/messages" and i-node "51114", a set of a file path "/var/log/messages.1" and i-node "51112", and a set of a file path "/var/log/messages.2" and i-node "51133", as file identification information.

Upon acquiring the file identification information, the file group copying unit 106 requests the file copy destination generation unit 107 for copy destination information corresponding to this file identification information (FIG. 8A, step S708). In this embodiment, the file group copying unit 106 requests for copy destination information corresponding to the set of a file path "/var/log/messages" and i-node "51144".

Then, the file copy destination generation unit 107 extracts the file identification information from the request made by the file group copying unit 106, generates file copy destination information corresponding to this file identification information (FIG. 9, step S800), and transmits the generated file copy destination information to the file group copying unit 106 (FIG. 9, step S801). In this embodiment, the file copy destination generation unit 107 generates a file copy destination file path "/tmp/copy_tmp/copy_file_000001" and a write destination file path "/tmp/copy_tmp/map_file_000002" for other information, as file copy destination information. The other information includes a file path of the copy origin, file update date and time, i-node, file creation date and time, and a file size, which are stored while being associated with the copy destination file.

When the file group copying unit 106 acquires the file copy destination information from the file copy destination generation unit 107, the file group copying unit 106 copies the copy object file to the copy destination designated in this information (FIG. 8B, step S709). In this embodiment, the file group copying unit 106 copies a file of the file path "/var/log/messages" to the storage area of the copy destination file path "/tmp/copy_tmp/copy_file_000001", and further, stores the file path "/var/log/messages" of the copy origin, file update date and time, i-node, file creation date and time, and the file size in the storage area of the file path "/tmp/copy_tmp/map_file_000002" while being associated with the file of the file path "/tmp/copy_tmp/copy_file_000001". Here, it is assumed that the copying has been performed successfully.

When the file group copying unit 106 determines that the copying has been performed successfully (FIG. 8B, step S710, Y), the file group copying unit 106 makes a rotation detection request for the file which has been copied successfully, to the rotation detection unit 105 (FIG. 8B, step S711). In this embodiment, the file group copying unit 106 makes a rotation detection request for a file of the file path "/var/log/messages".

When the rotation detection unit 105 receives the rotation detection request, if this request is a rotation detection request for the file which has been copied successfully (FIG. 7A, step S600(b)), the rotation detection unit 105 makes a file identification information acquiring request to the file identification information acquiring unit 103 while designating the file path included in the rotation detection request (FIG. 7B, step S609). In this embodiment, the rotation detection unit 105 makes a file identification information acquiring request for the file path "/var/log/messages".

When the file identification information acquiring unit 103 receives the file identification information acquiring request from the rotation detection unit 105, if this request is a file identification information acquiring request designating a file path (FIG. 6, step S400(b)), the file identification information acquiring unit 103 acquires file identification information of the designated file path from the copy object file group 108 (FIG. 6, step S404), and transmits the acquired file identification information to the rotation detection unit 105 (FIG. 6, step S405). In this embodiment, the file identification information acquiring unit 103 acquires i-node "51114" as file identification information corresponding to the designated file path "/var/log/messages".

When the rotation detection unit 105 acquires the file identification information from the file identification information acquiring unit 103, the rotation detection unit 105 compares this file identification information with the file identification information acquired in the step S707 of FIG. 8A (FIG. 7B, step S610). It is assumed that the rotation detection unit 105 has acquired the file identification information acquired by the file group copying unit in the step S707 of FIG. 8A, from the file group copying unit 106. In this embodiment, a set of a file path "/var/log/messages" and i-node "51114" acquired in the step S610 and a set of a file path "/var/log/messages" and i-node "51114" acquired in the step S707 coincide. Accordingly, the rotation detection unit 105 determines that no rotation occurred (FIG. 7B, step S611, N).

When the rotation detection unit 105 determines that no rotation occurred, the rotation detection unit 105 notifies the file group copying unit 106 that no rotation occurred (FIG. 7A, step S608).

When the file group copying section 106 is notified from the rotation detection unit 105 that no rotation occurred (FIG. 8B, step S712, N), the file group copying section 106 checks whether there is any file which has not been copied in the rotation group of the copy object (FIG. 8B, step S713). If there is a file which has not been copied (FIG. 8B, step S713, Y), the file group copying unit 106 requests the file copy destination generation unit 107 for copy destination information of this file (FIG. 8B, step S708). In this embodiment, a file of the file path "/var/log/messages.1" remains uncopied in the copy object rotation group "messages". As such, the file group copying unit 106 requests for copy destination information of a set of a file path "/var/log/messages.1" and i-node "51112".

Then, the file copy destination generation unit 107 extracts the file identification information from the request made by the file group copying unit 106, generates file copy destination information corresponding to this file identification information (FIG. 9, step S800), and transmits the generated file copy destination information to the file group copying unit 106 (FIG. 9, step S801). In this embodiment, file copy destination generation unit 107 generates a copy destination file path "/tmp/copy_tmp/copy_file__000002" and a write destination file path "/tmp/copy_tmp/map_file__000002" for other information, as file copy destination information. The other information includes a file path of the copy origin, file update date and time, i-node, file creation date and time, and file size, which are stored while being associated with the copy destination file.

When the file group copying unit 106 acquires the file copy destination information from the file copy destination generation unit 107, the file group copying unit 106 copies the copy object file to the copy destination designated in this information (FIG. 8B, step S709). In this embodiment, the file group copying unit 106 copies a file of the file path "/var/log/messages.1" to the storage area of the copy destination file path "/tmp/copy_tmp/copy_file__000002", and stores the file path "/var/log/messages.1" of the copy origin, file update date and time, i-node, file creation date and time, and file size in the storage area of the file path "/tmp/copy_tmp/map_file__000002" in the form of being associated with the file of the file path "/tmp/copy_tmp/copy_file__000002". Here, it is assumed that the copying has been performed successfully.

Then, the file group copying unit 106 determines whether the copying has been performed successfully (FIG. 8B, step S710). If the file group copying unit 106 determines that the copying has been performed successfully (FIG. 8B, step S710, Y), the file group copying unit 106 makes a rotation detection request for the file which has been copied successfully to the rotation detection unit 105 (FIG. 8B, step S711). In this embodiment, the file group copying unit 106 makes a rotation detection request for a file of the file path "/var/log/messages.1".

When the rotation detection unit 105 receives the rotation detection request, if this request is a rotation detection request for the file which has been copied successfully (FIG. 7A, step S600(b)), the rotation detection unit 105 makes a file identification information acquiring request to the file identification information acquiring unit 103 while designating the file path included in this rotation detection request (FIG. 7B, step S609). In this embodiment, the rotation detection unit 105 makes a file identification information acquiring request for the file path "/var/log/messages.1".

When the file identification information acquiring unit 103 receives the file identification information acquiring request from the rotation detection unit 105, if this request is a file identification information acquiring request designating a file path (FIG. 6, step S400(b)), the file identification information acquiring unit 103 acquires file identification information of the designated file path from the copy object file group 108 (FIG. 6, step S404), and transmits the acquired file identification information to the rotation detection unit 105 (FIG. 6, step S405). In this embodiment, the file identification information acquiring unit 103 acquires i-node "51112" as file identification information corresponding to the designated file path "/var/log/messages.1".

When the rotation detection unit 105 acquires the file identification information from the file identification information acquiring unit 103, the rotation detection unit 105 compares this file identification information with the file identification information acquired in the step S707 of FIG. 8A (FIG. 7B, step S610). It is assumed that the rotation detection unit 105 has acquired the file identification information acquired by the file group copying unit 106 in the step S707 of FIG. 8A, from the file group copying unit 106. In this embodiment, the set of a file path "/var/log/messages.1" and i-node "51112" acquired in the step S610 and the set of a file path "/var/log/messages.1" and i-node "51112" acquired in the step S707 coincide. Accordingly, the rotation detection unit 105 determines that no rotation occurred (FIG. 7B, step S611, N).

When the rotation detection unit 105 determines that no rotation occurred, the rotation detection unit 105 notifies the file group copying unit 106 that no rotation occurred (FIG. 7A, step S608).

When the file group copying unit 106 is notified from the rotation detection unit 105 that no rotation occurred (FIG. 8B, step S712, N), the file group copying unit 106 checks whether there is any file which has not been copied in the copy object rotation group (FIG. 8B, step S713). If there is a file which has not been copied (FIG. 8B, step S713, Y), the file group copying unit 106 requests the file copy destination generation unit 107 for copy destination information of this file (step S708). In this embodiment, a file of the file path "/var/log/messages.2" remains uncopied in the copy object rotation group "messages". As such, the file group copying unit 106 requests for copy destination information corresponding to a set of a file path "/var/log/messages.2" and i-node "51133".

Then, the file copy destination generation unit 107 extracts the file identification information from the request made by the file group copying unit 106, generates file copy destination information corresponding to this file identification information (FIG. 9, step S800), and transmits the generated file copy destination information to the file group copying unit 106 (FIG. 9, step S801). In this embodiment, the file copy destination generation unit 107 generates a copy destination file path "/tmp/copy_tmp/copy_file__000003" and a write destination file path "/tmp/copy_tmp/map_file__000002" for other information, as file copy destination information. The other information includes a file path of the copy origin, file update date and time, i-node, file creation date and time, and file size, which are stored while being associated with the copy destination file.

When the file group copying unit 106 acquires the file copy destination information from the file copy destination generation unit 107, the file group copying unit 106 copies the copy object file to the copy destination designated in this information (FIG. 8B, step S709). In this embodiment, the file group copying unit 106 copies a file of the file path "/var/log/messages.2" to the storage area of the copy destination file path "/tmp/copy_tmp/copy_file__000003". Further, the file group copying unit 106 copies the file path "/var/log/messages.2" of the copy origin, file update date and time, i-node, file creation date and time, and file size to the storage area of the file path "/tmp/copy_tmp/map_file__000002" in the form of being associated with the file of the file path "/tmp/copy_tmp/copy_file__000003". Here, it is assumed that the copying is performed successfully.

Then, the file group copying unit 106 determines whether the copying has been performed successfully (FIG. 8B, step S710). When the file group copying unit 106 determines that the copying has been performed successfully (FIG. 8B, step S710, Y), the file group copying unit 106 makes a rotation detection request for the file which has been copied successfully, to the rotation detection unit 105 (FIG. 8B, step S711). In this embodiment, the file group copying unit 106 makes a rotation detection request for a file of the file path "/var/log/messages.2".

When the rotation detection unit 105 receives the rotation detection request, if this request is a rotation detection request for the file which has been copied successfully (FIG. 7A, step S600(b)), the rotation detection unit 105 makes a file identification information acquiring request to the file identification information acquiring unit 103 while designating the file path included in the rotation detection request (FIG. 7B, step S609). In this embodiment, the rotation detection unit 105 makes a file identification information acquiring request for the file path "/var/log/messages.2".

When the file identification information acquiring unit 103 receives the file identification information acquiring request from the rotation detection unit 105, if this request is a file identification information acquiring request designating a file path (FIG. 6, step S400), the file identification information acquiring unit 103 acquires file identification information of the designated file path from the copy object file group 108 (FIG. 6, step S404), and transmits the acquired file identification information to the rotation detection unit 105 (FIG. 6, step S405). In this embodiment, the file identification information acquiring unit 103 acquires i-node "51133" as file identification information corresponding to the designated file path "/var/log/messages.2".

When the rotation detection unit 105 acquires the file identification information from the file identification information acquiring unit 103, the rotation detection unit 105 compares this file identification information with the file identification information acquired in the step S707 of FIG. 8A (FIG. 7B, step S610). It is assumed that the rotation detection unit 105 has acquired the file identification information acquired by the file group copying unit 106 in the step S707 of FIG. 8A, from the file group copying unit 106. In this embodiment, as the set of a file path "/var/log/messages.2" and i-node "51133" acquired in the step S610 and a set of the file path "/var/log/messages.2" and i-node "51133" acquired in the step S707 coincide, the rotation detection unit 105 determines that no rotation occurred.

When the rotation detection unit 105 determines that no rotation occurred, the rotation detection unit 105 notifies the file group copying unit 106 that no rotation occurred (FIG. 7A, step S608).

When the file group copying unit 106 is notified from the rotation detection unit 105 that no rotation occurred (FIG. 8B, step S712, N), the file group copying unit 106 checks whether there is any file which has not been copied in the copy object rotation group (FIG. 8B, step S713). If there is no file which has not been copied (FIG. 8B, step S713, N), the file group copying unit 106 notifies the user that copying of the file group of the copy object rotation group has been completed (FIG. 8B, step S714). In this embodiment, the file group copying unit 106 confirms that there is no subsequent file in the rotation group "messages", and notifies that copying of the file group has been completed. Through these processes, copying of the file group of one rotation group has been completed.

As described above, in the present embodiment, even for a group of files in which the generations thereof are managed by changes in the file names, occurrence of rotation can be detected, whereby proper management can be performed.

It should be noted that the present invention is not limited to this embodiment.

Fourth Exemplary Embodiment

Next, a fourth exemplary embodiment will be described in detail with reference to the drawings. The present embodiment describes the first exemplary embodiment more specifically. Even in this embodiment, as the configuration and operation of the file management device 100a are the same as those of the second exemplary embodiment, they will be described using FIGS. 2 to 9.

First, the rotation group creation unit 101 creates rotation groups according to designation by a user in order to group the copy object file group 108 into rotation groups (FIG. 5, step S200). In this embodiment, it is assumed that creation of a rotation group called "Apache access" is designated by the user.

Then, the rotation group creation unit 101 receives designation of file paths of files belonging to the rotation group created in the step S200 from the user (FIG. 5, step S201). A plurality of file paths can be designated, and wildcards and regular expressions may also be used. In this embodiment, file paths of "C:¥Apache2.2¥logs¥access_log" and "C:¥Apache2.2¥logs¥access_log.?" are designated by the user.

Then, the rotation group creation unit 101 receives designation of file identification information of the files belonging to the rotation group created in the step S200 from the user (FIG. 5, step S202). As the file identification information, a file path, file size, file creation date and time, file update date and time, i-node (object identifier), current time, and file data may be used. In this embodiment, a file path, file update date and time, current time, and file data are designated by the user as types of information to be used as file identification information.

When the rotation group creation unit 101 receives a notification that creation of the rotation group has been completed, the rotation group creation unit 101 stores information of the rotation group in the rotation group management unit 102 (FIG. 5, step S203). In this embodiment, only one rotation group called "Apache access" is created. When the rotation group is created in this manner, the file management device 100a is able to copy a copy object file group 108 and detect rotation, which will be described below.

When the file group copying unit 106 receives a copy request for a file group from the user (FIG. 8A, step S700), the file group copying unit 106 makes a rotation detection request for the entire rotation group to the rotation detection unit 104 (FIG. 8A, step S701). In this embodiment, the file group copying unit 106 receives a copy request for the rotation group "Apache access".

When the rotation detection unit 105 receives the rotation detection request, if this request is a rotation detection request for the entire rotation group (FIG. 7A, step S600(a)), the rotation detection unit 105 makes a file identification information acquiring request to the file identification information acquiring unit 103 (FIG. 7A, step S601). In this embodiment, the rotation detection unit 105 receives the rotation detection request for the rotation group "Apache access" from the file group copying unit 106, and makes a file identification information acquiring request for the rotation group "Apache access" to the file identification acquiring unit 103.

When the file identification information acquiring unit 103 receives the file identification information acquiring request from the rotation detection unit 105, if this request is a file identification information acquiring request for a rotation group (FIG. 6, step S400(a)), the identification information acquiring unit 103 acquires information of the rotation group corresponding to the request, from the rotation group management unit 102 (FIG. 6, step S401). In this embodiment, the file identification information acquiring unit 103 acquires a set of a file path "C:¥Apache2.2¥logs¥access_log" and file identification information "file path", "update date and time", "current time", and "file data", and a set of a file path "C:¥Apache2.2¥logs¥access_log.?" and file identification information "file path", "update date and time", "current time", and "file data", as information of the rotation group "Apache access".

Upon receiving the information of the rotation group, the file identification information acquiring unit 103 acquires file identification information corresponding to the information of this rotation group from the copy object file group 108 (FIG. 6, step S402), and stores the acquired file identification information in the file identification information management unit 104 (FIG. 6, step S403). In this embodiment, the file identification information acquiring unit 103 acquires and stores a set of a file path "C:¥Apache2.2¥logs¥access_log", update date and time "2008/01/01 10:00:00.000", current time "2008/01/01 10:00:01.111" and file data "10.34.75.220—[12/Dec/2007:10:00:01+0900]"GET/HTTP/1.1" 200 44", and a set of a file path "C:¥Apache2.2¥logs¥access_log.1" and update date and time "2007/12/12 09:59:59.955", current time "2008/01/01 10:00:01.111", and file date "10.34.75.221—[30/Nov/2007:08:30:11+0900] "GET/HTTP/1.1" 200—", as file identification information. It should be noted that acquisition of current time is performed before acquiring the update date and time. Further, file data is acquired from the head of the file for a predetermined size or the number of records. In this embodiment, it is assumed that file data is acquired for one record.

Although the rotation detection unit 105 is adapted to perform the processes of the steps S602 to S605 after the step S601 as shown in FIG. 7A, the expected effects can be achieved without performing the processes of the step S602 to S605. Accordingly, in the present embodiment, the steps S602 to S605 are not performed. In that case, a determination result of the step S606 is "no rotation occurred" (FIG. 7A, step S606, N). As such, the rotation detection unit 105 notifies the file group copying unit 106 that no rotation occurred (FIG. 6, step S608).

When the file group copying unit 106 is notified from the rotation detection unit 105 that no rotation occurred (FIG. 8A, step S702, N), the file group copying unit 106 acquires file identification information of the rotation group from the file identification information management unit 104 (FIG. 8B, step S707). In this embodiment, the file group copying unit 106 acquires a set of a file path "C:¥Apache2.2¥logs¥access_log.1", update date and time "2008/01/01 10:00:00.000", current time "2008/01/01 10:00:01.111", and file data "10.34.75.220—[12/Dec/2007:10:00:01+0900] "GET/HTTP/1.1" 200 44", and a set of a file path "C:¥Apache2.2¥logs¥access_log.1", update date and time "2007/12/12 09:59:59.955", current time "2008/01/01 10:00:01.111", and file data "10.34.75.221—[30/Nov/2007:08:30:11+0900] "GET/HTTP/1.1" 200—", as file identification information.

Upon receiving the file identification information, the file group copying unit 106 requests the file copy destination generation unit 107 for copy destination information corresponding to this file identification information (FIG. 8B, step S708). In this embodiment, the file group copying unit 106 requests for copy destination information corresponding to the set of a file path "C:¥Apache2.2¥logs¥access_log", update date and time "2008/01/01 10:00:00.000", current time "2008/01/01 10:00:01.111", and file data "10.34.75.220—[12/Dec/2007:10:00:01+0900] "GET/HTTP/1.1" 200 44".

Then, the file copy destination generation unit 107 extracts the file identification information from the request made by the file group copying unit 106, and generates file copy destination information corresponding to this file identification information (FIG. 9, step S800), and transmits the generated file copy destination information to the file group copying unit 106 (FIG. 9, step S801). In this embodiment, the file copy destination generation unit 107 generates a copy destination file path "/tmp/copy_tmp/copy_file_000001" and a write destination file path "/tmp/copy_tmp/map_file_000003" for other information. The other information includes a file path of the copy origin, file update date and time, i-node, file creation date and time, and file size, which are stored while being associated with the copy destination file.

When the file group copying unit 106 acquires the file copy destination information from the file copy destination generation unit 107, the file group copying unit 106 copies the copy object file to the copy destination designated in this information (FIG. 8B, step S709). Here, it is assumed that the copying is performed successfully.

Then, the file group copying unit 106 determines whether the copying has been performed successfully (FIG. 8B, step S710). If the file group copying unit 106 determines that the copying has been performed successfully (FIG. 8B, step S710, Y), the file group copying unit 106 makes a rotation detection request for the file which has been copied successfully, to the rotation detection unit 105 (FIG. 8B, step S711). In this embodiment, the file group copying unit 106 makes a rotation detection request for a file of the file path "C:¥Apache2.2¥logs¥access_log".

When the rotation detection unit 105 receives the rotation detection request, if this request is a rotation detection request for the file which has been copied successfully (FIG. 7A, step S600(*b*)), the rotation detection unit 105 makes a file identification information acquiring request to the file identification information acquiring unit 103 while designating the file path included in the rotation detection request (FIG. 7B, step S609). In this embodiment, the rotation detection unit 105 makes a file identification information acquiring request for the file path "C:¥Apache2.2¥logs¥access_log".

When the file identification information acquiring unit 103 receives the file identification information acquiring request from the rotation detection unit 105, if this request is a file identification information acquiring request designating a file path (FIG. 6, step S400(*b*)), the file identification information acquiring unit 103 acquires file identification information of the designated file path from the copy object file group 108 (FIG. 6, step S404), and transmits the acquired file identification information to the rotation detection unit 105 (FIG. 6, step S405). In this embodiment, the file identification information acquiring unit 103 acquires update date and time "2008/01/01 10:00:02.000", current time "2008/01/01 10:00:02.222", and file data "10.34.75.220—[12/Dec/2007:10:00:01+0900] GET/HTTP/1.1" 200 44", as file identification information corresponding to the designated file path "C:¥Apache2.2¥logs¥access_log".

When the rotation detection unit 105 acquires the file identification information from the file identification information acquiring unit 103, the rotation detection unit 105 compares this file identification information with the file identification information acquired in the step S707 of FIG. 8A (FIG. 7B, step S610). It is assumed that the rotation detection unit 105 has acquired the file identification information acquired by the file group copying unit 106 in the step S707 of FIG. 8A, from the file group copying unit 106. In this embodiment, the rotation detection unit 105 compares the set of a file path "C:¥Apache2.2¥logs¥access_log", update date and time "2008/01/01 10:00:02.000", current time "2008/01/01 10:00:02.222", and file data "10.34.75.220—[12/Dec/2007:10:00:01+0900] "GET/HTTP/1.1" 200 44" acquired in the step S610, with the set of a file path "C:¥Apache2.2¥logs¥access_log", update date and time "2008/01/01 10:00:00.000", current time "2008/01/01 10:00:01.111", and file data "10.34.75.220—[12/Dec/2007:10:00:01+0900] "GET/HTTP/1.1" 200 44" acquired in the step S707.

The update date and time "2008/01/01 10:00:02.000" acquired in the step S610 and the update date and time "2008/01/01 10:00:00.000" acquired in the step S707 do not coincide. However, as the update date and time "2008/01/01 10:00:02.000" acquired in the step S610 is later than the current time "2008/01/01 10:00:01.111" acquired in the step S707, and the file data "10.34.75.220—[12/Dec/2007:10:00:01+0900] "GET/HTTP/1.1" 200 44" acquired in the step S610 and the file data "10.34.75.220—[12/Dec/2007:10:00:01+0900] "GET/HTTP/1.1" 200 44" acquired in the step S707 coincide, the rotation detection unit 105 determines that no rotation occurred.

It should be noted that detection of rotation using update date and time, current time, and file data is performed based on the following criteria:

(a) If update date and time is not changed, the rotation detection unit 105 determines that no rotation occurred.

(b) If update date and time is changed and the changed date and time is before the current time acquired beforehand in the step S707 of FIG. 8B, the rotation detection unit 105 determines that rotation occurred.

(c) If update date and time is changed and the changed date and time is the same as or after the current time acquired beforehand in the step S707 of FIG. 8B, the rotation determination unit 105 compares the pieces of file data, and determines that no rotation occurred if they coincide, and determines that rotation occurred if they do not coincide.

Then, when the rotation detection unit 105 determines that no rotation occurred (FIG. 7B, step S611, N), the rotation detection unit 105 notifies the file group copying unit 106 that no rotation occurred (FIG. 7A, step S608).

When the file group copying unit 106 is notified from the rotation detection unit 105 that no rotation occurred (FIG. 8B, step S712, N), the file group copying unit 106 checks whether there is a file which has not been copied in the copy object rotation group (FIG. 8B, step S713). If there is a file which has not been copied (FIG. 8B, step S713, Y), the file group copying unit 106 requests the file copy destination generation unit 107 for copy destination information of this file (FIG. 8B, step S708). In this embodiment, a file of a file path "C:¥Apache2.2¥logs¥access_log.1" remains uncopied in the copy object rotation group "Apache access". As such, the file group copying unit 106 requests for a copy destination information for a set of a file path "C:¥Apache2.2¥logs¥access_log.1", update date and time "2007/12/12 09:59:59:955", current time "2008/01/01 10:00:01.111" and file data "10.34.75.221—[30/Nov/2007:08:30:11+0900] "GET/HTTP/1.1" 200—".

Here, it is assumed that rotation begins, and that the file path "C:¥Apache2.2¥logs¥access_log.1" is rewritten into "C:¥Apache2.2¥logs¥access_log.2", the file path "C:¥Apache2.2¥logs¥access_log" is rewritten into "C:¥Apache2.2¥logs¥access_log.1", and a new file path "C:¥Apache2.2¥logs¥access_log" is generated.

Then, the file copy destination generation unit 107 extracts the file identification information from the request by the file group copying unit 106, generates file copy destination information corresponding to this file identification information (FIG. 9, step S800), and transmits the generated file copy destination information to the file group copying unit 106 (FIG. 9, step S801). In this embodiment, the file copy destination generation unit 107 generates a copy destination file path "/tmp/copy_tmp/copy_file_000002" and a write destination file path "/tmp/copy_tmp/map_file_000003" for other information, as file copy destination information. The other information includes a file path of the copy origin, file update date and time, i-node, file creation date and time, and a file size, which are stored while being associated with the copy destination file.

Then, when the file group copying unit 106 receives the file copy destination information from the file copy destination generation unit 107, the file group copying unit 106 copies the copy object file to the copy destination designated in this information (FIG. 8B, step S709). In this embodiment, the file group copying unit 106 copies the file of the file path "C:¥Apache2.2¥logs¥access_log.1" to the storage area of the copy destination file path "/tmp/copy_tmp/copy_file_000002". Further, the file group copying unit 106 stores the copy origin file path "C:¥Apache2.2¥logs¥access_log.1", the file update date and time, the i-node, the file creation date and time, and the file size in the storage area of the file path "/tmp/copy_tmp/map_file_000003" in the form of being associated with the file of the file path "/tmp/copy_tmp/copy_file_000002". Here, it is assumed that the copying is performed successfully.

Then, the file group copying unit 106 determines whether the copying is performed successfully (FIG. 8B, step S710). If the file group copying unit 106 determines that the copying is performed successfully (FIG. 8B, step S710, Y), the file group copying unit 106 makes a rotation detection request for the file which has been copied successfully to the rotation detection unit 105 (FIG. 8B, step S711). In this embodiment, the file group copying unit 106 makes a rotation detection request for the file of the file path "C:¥Apache2.2¥logs¥access_log.1".

When the rotation detection unit 105 receives the rotation detection request, if this request is a rotation detection request for the file which has been copied successfully (FIG. 7A, step S600(b)), the rotation detection unit 105 makes a file identification information acquiring request to the file identification information acquiring unit 103 while designating the file path included in the rotation detection request (FIG. 7B, step S609). In this embodiment, the rotation detection unit 105 makes a file identification information acquiring request for the file path "C:¥Apache2.2¥logs¥access_log.1".

When the file identification information acquiring unit 103 receives the file identification information acquiring request from the rotation detection unit 105, if this request is a file identification information acquiring request designating a file path (FIG. 6, step S400(b)), the file identification information acquiring unit 103 acquires the file identification information of the designated file path from the copy object file group 108 (FIG. 6, step S404), and transmits the acquired file identification information to the rotation detection unit 105 (FIG. 6, step S405). In this embodiment, the file identification information acquiring unit 103 acquires a set of update date and time "2008/01/01 10:00:02.000", current time "2008/01/01 10:00:01.111", and file date "10.34.75.220—[12/Dec/2007:10:00:01+0900] "GET/HTTP/1.1" 200 44" as file identification information corresponding to the designated file path "C:¥Apache2.2¥logs.access_log.1".

When the rotation detection unit 105 acquires the file identification information from the file identification information acquiring unit 103, the rotation detection unit 105 compares this file identification information with the file identification information acquired in the step S707 of FIG. 8A (FIG. B, step S610). It is assumed that the rotation detection unit 105 has acquired the file identification information acquired by the file group copying unit 106 in the step S707 of FIG. 8A, from the file group copying unit 106. In this embodiment, the rotation detection unit 105 compares the set of a file path "C:¥Apache2.2¥logs.access_log.1", update date and time "2008/01/01 10:00:02.000", current time "2008/01/01 10:00:01.111", and file data "10.34.75.220—[12/Dec/2007:10:00:01+0900] "GET/HTTP/1.1" 200 44" acquired in the step S610, with the set of a file path "C:¥Apache2.2¥logs¥access_log.1", update date and time "2007/12/12 09:59:59.955", current time "2008/01/01 10:00:01.111", with file data "10.34.75.221—[30/Nov/2007:08:30:11+0900] "GET/HTTP/1.1" 200—" acquired in the step S707.

In this comparison, the update date and time "2008/01/01 10:00:02.000" acquired in the step S610 and the update date and time "2007/12/12 09:59:59.955" acquired in the step S707 do not coincide. Further, the update date and time "2008/01/01 10:00:02.000" acquired in the step S610 is later than the update date and time "2008/01/01 10:00:01.111" acquired in the step S707, and further, the file data "10.34.75.220—[12/Dec/2007:10:00:01+0900] "GET/HTTP/1.1" 200 44" acquired in the step S610 and the file data "10.34.75.221—[30/Nov/2007:08:30:11+0900] "GET/HTTP/1.1" 200—" acquired in the step S707 do not coincide. Accordingly, the rotation detection unit 105 determines that rotation occurred (FIG. 7B, step S611, Y).

When the rotation detection unit 105 determines that rotation occurred, the rotation detection unit 105 notifies the file group coping unit 106 that rotation occurred (FIG. 7B, step S607).

When the file group copying unit 106 is notified from the rotation detection unit 106 that rotation occurred (FIG. 8B, step S712, Y), the file group copying unit 106 counts up a retry count value (FIG. 8A, step S703), and determines whether the retry count value after the count-up is a maximum number of retries or smaller (FIG. 8A, step S704). If the retry count value is the maximum number of retries or smaller (FIG. 8A, step S704, Y), the file group copying unit 106 waits for a predetermined retry interval (FIG. 8A, step S705). In this embodiment, the maximum number of retries is set to "2", and the retry count value is counted up from "0" to "1" (FIG. 8A, step S703). Further, the retry interval is set to "2 seconds", and so the file group copying unit 106 waits for two seconds and restarts processing (FIG. 8A, step S705).

If the retry count number after the count-up in the step S703 is larger than the maximum number of retries (FIG. 8A, step S704, N), the file group copying unit 106 notifies the user that copying of the file group of the rotation group is performed unsuccessfully (FIG. 8A, step S706), and ends the copying process.

If the retry count value is the maximum number of retries or smaller, the file group coping unit 106 waits for the retry interval (FIG. 8A, step S705), and makes a rotation detection request for the entire rotation group of the copy object to the rotation detection unit 105 (FIG. 8A, step S701). In this embodiment, the file group coping unit 106 makes a rotation detection request for the rotation group "Apache access".

When the rotation detection unit 105 receives the rotation detection request (FIG. 7, step S600), if this request is a rotation detection request for the entire rotation group (FIG. 7A, step S600(a)), the rotation detection unit 105 makes a file identification information acquiring request to the file identification information acquiring unit 103 (step S601). In this embodiment, the rotation detection unit 105 receives a rotation detection request for the rotation group "Apache access" from the file group copying unit 106, and makes a file identification information acquiring request for the rotation group "Apache access" to the file identification information acquiring unit 103.

When the file identification information acquiring unit 103 receives the file identification information acquiring request from the rotation detection unit 105, if this request is a file identification information acquiring request for the rotation group (FIG. 6, step S400), the file identification information acquiring unit 103 acquires information of the rotation group corresponding to the request from the rotation group management unit 102 (FIG. 6, step S401). In this embodiment, the file identification information acquiring unit 103 acquires a set of a file path "C:¥Apache2.2¥logs¥access_log" and file identification information "file path", "update date and time", "current time", and "file data", and a set of a file path "C:¥Apache2.2¥logs¥access_log.?" and file identification information "file path", "update date and time", "current time" and "file data", as information of the rotation group "Apache access".

Upon acquiring the information of the rotation group, the file identification information acquiring unit 103 acquires file identification information corresponding to the information of this rotation group from the copy object file group 108 (FIG. 6, step S402), and stores the acquired file identification information in the file identification information management unit 104 (FIG. 6, step S403). In this embodiment, the file identification information acquiring unit 103 acquires and stores a set of a file path "C:¥Apache2.2¥logs¥access_log", update date and time "2008/01/01 10:00:03.000", current time "2008/01/01 10:00:05.111", and file data "10.34.75.219—[01/Jan/2008:10:00:03+0900] "GET/HTTP/1.1" 200—", a set of a file path "C:¥Apache2.2¥logs¥access_log.1", update date and time "2008/01/01 10:00:02.000", current time "2008/01/01 10:00:05.111", and file data "10.34.75.220—[12/Dec/2007:10:00:01+0900] "GET/HTTP/1.1" 200 44", and a set of a file path "C:¥Apache2.2¥logs¥access_log.2", update date and time "2007/12/12 09:59:59.955", current time "2008/01/01 10:00:05.111", and file data "10.34.75.221—[30/Nov/2007:08:30:11+0900] GET/HTTP/1.1" 200—".

Although the rotation detection unit 105 is adapted to perform the processes of the steps S602 to S605 after the step S601 in FIG. 7A, the processes of the steps S602 to S605 are not performed in the present embodiment as described above. In the case where the processes of the step S602 to S605 are not performed as described above, a determination result of the step S606 is "no rotation occurred". Accordingly, the rotation detection unit 105 notifies the file group copying unit 106 that no rotation occurred (FIG. 7A, step S608).

When the file group copying unit 106 is notified from the rotation detection unit 105 that no rotation occurred (FIG. 8A, step S702, N), the file group copying unit 106 acquires file identification information of the rotation group from the file identification information management unit 104 (FIG. 8B, step S707). In this embodiment, the file group copying unit 106 acquires a set of a file path "C:¥Apache2.2¥logs¥access_log", update date and time "2008/01/01 10:00:03.000", current time "2008/01/01 10:00:05.111", and file data "10.34.75.219—[01/Jan/2008:10:00:03+0900] "GET/HTTP/1.1" 200—", a set of a file path "C:¥Apache2.2¥logs¥access_log.1", update date and time "2008/01/01 10:00:02.000", current time "2008/01/01 10:00:05.111", and file data "10.34.75.220—[12/Dec/2007:10:00:01+0900] "GET/HTTP/1.1" 200 44", and a set of a file path "C:¥Apache2.2¥logs¥access_log.2", update date and time "2007/12/12 09:59:59.955", current time "2008/01/01 10:00:05.111", and file data "10.34.75.221—[30/Nov/2007:08:30:11+0900] "GET/HTTP/1.1" 200—".

Upon receiving the file identification information, the file group copying unit 106 requests the file copying destination generation unit 107 for copy destination information corresponding to this file identification information (FIG. 8A, step S708). In this embodiment, the file group copying unit 106 requests for copy destination information corresponding to the set of a file path "C:¥Apache2.2¥logs¥access_log", update date and time "2008/01/01 10:00:03.000", current time "2008/01/01 10:00:05.111", and file data "10.34.75.219—[01/Jan/2008:10:00:03+0900] "GET/HTTP/1.1" 200—".

Then, the file copy destination generation unit 107 extracts the file identification information from the request made by the file group copying unit 106, generates file copy destination information corresponding to this file identification information (FIG. 9, step S800), and transmits the generated file copy destination information to the file group copying unit 106 (FIG. 9, step S801). In this embodiment, the file copy destination generation unit 107 generates a copy destination file path "/tmp/copy_tmp/copy_file_000001" and a write destination file path "/tmp/copy_tmp/map_file_000003" for other information, as file copy destination information. The other information includes a file path of the copy origin, file update date and time, i-node, file creation date and time, and a file size, which are stored while being associated with the copy destination file.

When the file group copying unit 106 acquires the file copy destination information from the file copy destination generation unit 107, the file group copying unit 106 copies the copy object file to the copy destination designated in this information (FIG. 8B, step S709). In this embodiment, it is assumed that the copying is performed successfully.

When the file group copying unit 106 determines that the copying is performed successfully (FIG. 8B, step S710, Y), the file group copying unit 106 makes a rotation detection request for the file which has been copied successfully to the rotation detection unit 105 (FIG. 8B, step S711). In this embodiment, the file group copying unit 106 makes a rotation detection request for a file of the file path "C:¥Apache2.2¥logs¥access_log".

When the rotation detection unit 105 receives the rotation detection request, if this request is a rotation detection request for the file which has been copied successfully (FIG. 7A, step S600(*b*)), the rotation detection unit 105 makes a file identification information acquiring request to the file identification information acquiring unit 103 while designating the file path included in the rotation detection request (FIG. 7B, step S609). In this embodiment, the rotation detection unit 105 makes a file identification information acquiring request for the file path "C:¥Apache2.2¥logs¥access_log".

When the file identification information acquiring unit 103 receives the file identification information acquiring request from the rotation detection unit 105, if this request is a file identification information acquiring request designating a file path (FIG. 6, step S400(*b*)), the file identification information acquiring unit 103 acquires file identification information of the designated file path from the copy object file group 108 (FIG. 6, step S404), and transmits the file identification information to the rotation detection unit 105 (FIG. 6, step S405). In this embodiment, the file identification information acquiring unit 103 acquires a set of update date and time "2008/01/01 10:00:03.000", current time "2008/01/01 10:00:06.211" and file data "10.34.75.219—[01/Jan/2008:10:00:03+0900] "GET/HTTP/1.1" 200—", as file identification information corresponding to the designated file path "C:¥Apache2.2¥logs¥access_log".

When the rotation detection unit 105 acquires the file identification information from the file identification information acquiring unit 103, the rotation detection unit 105 compares this file identification information with the file identification information acquired in the step S707 of FIG. 8A (FIG. 7B, step S610). It is assumed that the rotation detection unit 105 has acquired the file identification information acquired by the file group copying unit 106 in the step S707 of FIG. 8A, from the file group copying unit 106. In this embodiment, the update date and time "2008/01/01 10:00:03.000" acquired in the step S610 and the update date and time "2008/01/01 10:00:03.000" acquired in the step S707 coincide. Accordingly, the rotation detection unit 105 determines that no rotation occurred (FIG. 7B, step S611, N).

Then, when the rotation detection unit 105 determines that no rotation occurred, the rotation detection unit 105 notifies the file group copying unit 106 that no rotation occurred (FIG. 7A, step S608).

When the file group copying unit 106 is notified from the rotation detection unit 105 that no rotation occurred (FIG. 8B, step S712, N), the file group copying unit 106 checks whether there is a file which has not been copied in the copy object rotation group (FIG. 8B, step S713). If there is a file which has not been copied (FIG. 8B, step S713, Y), the file group copying unit 106 requests the file copy destination generation unit 107 for copy destination information of this file (FIG. 8B, step S708). In this embodiment, a file of a file path "C:¥Apache2.2¥logs¥access_log.1" remains uncopied in the copy object rotation group "Apache access". As such, the file group copying unit 106 requests for copy destination information for a set of a file path "C:¥Apache2.2¥logs¥access_log.1", update date and time "2008/01/01 10:00:02.000", current time "2008/01/01 10:00:05.111", and file data "10.34.75.220—[12/Dec/2007:10:00:01+0900] "GET/HTTP/1.1" 200 44".

Then, the file copy destination generation unit 107 extracts the file identification information from the request made by the file group copying unit 106, generates file copy destination information corresponding to this file identification information (FIG. 9, step S800), and transmits the generated file copy destination information to the file group copying unit 106 (FIG. 9, step S801). In this embodiment, the file copy destination generation unit 107 generates a copy destination file path "/tmp/copy_tmp/copy_file_000002" and a write destination file path "/tmp/copy_tmp/map_file_000003" for other information, as file copy destination information. The other information includes a file path of the copy origin, file update date and time, i-node, file creation date and time, and a file size, which are stored while being associated with the copy destination file.

When the file group copying unit 106 acquires the file copy destination information from the file copy destination generation unit 107, the file group copying unit 106 copies the copy object file to the copy destination designated in this information (FIG. 8B, step S709). In this embodiment, the file group copying unit 106 copies the file of a file path "C:¥Apache2.2¥logs¥access_log.1" to the storage area of the copy destination file path "/tmp/copy_tmp/copy_file_000002", and stores the copy origin file path "C:¥Apache2.2¥logs¥access_log.1", file update date and time, i-node, file creation date and time, and file size in the storage area of the file path "/tmp/copy_tmp/map_file_000003" in the form of being associated with the file of the file path "/tmp/copy_tmp/copy_file_000002". Here, it is assumed that the copying is performed successfully.

Then, the file group copying unit 106 determines whether the copying is performed successfully (FIG. 8B, step S710). If the file group copying unit 106 determines that the copying is performed successfully (FIG. 8B, step S710, Y), the file group copying unit 106 makes a rotation detection request for the file which has been copied successfully to the rotation detection unit 105 (FIG. 8B, step S711). In this embodiment, the file group copying unit 106 makes a rotation detection request for a file of a file path "C:¥Apache2.2¥logs¥access_log.1".

When the rotation detection unit 105 receives the rotation detection request, if this request is a rotation detection request for the file which has been copied successfully (FIG. 7A, step S600(b)), the rotation detection unit 105 makes a file identification information acquiring request to the file identification information acquiring unit 103 while designating the file path included in this rotation detection request (FIG. 7B, step S609). In this embodiment, the rotation detection unit 105 makes a file identification information acquiring request for the file path "C:¥Apache2.2¥logs¥access_log.1".

When the file identification information acquiring unit 103 receives the file identification information acquiring request from the rotation detection unit 105, if this request is a file identification information acquiring request designating a file path (FIG. 6, step S400(b)), the file identification information acquiring unit 103 acquires file identification information of the designated file path from the copy object file group 108 (FIG. 6, step S404), and transmits the acquired file identification information to the rotation detection unit 105 (FIG. 6, step S405). In this embodiment, the file identification information acquiring unit 103 acquires a set of update date and time "2008/01/01 10:00:02.000", current time "2008/01/01 10:00:05.111", and file data "10.34.75.220—[12/Dec/2007:10:00:01+0900] "GET/HTTP/1.1" 200 44", as file identification information corresponding to the designated file path "C:¥Apache2.2¥logs¥access_log.1".

When the rotation detection unit 105 acquires the file identification information from the file identification information acquiring unit 103, the rotation detection unit 105 compares this file identification information with the file identification information acquired in the step S707 (FIG. 7B, step S610). It is assumed that the rotation detection unit 105 has acquired the file identification information acquired by the file group copying unit 106 in the step S707 of FIG. 8A, from the file group copying unit 106. In this embodiment, the update date and time "2008/01/01 10:00:02.000" acquired in the step S610 and the update date and time "2008/01/01 10:00:02.000" acquired in the step S707 coincide. Accordingly, the rotation detection unit 105 determines that no rotation occurred (FIG. 7B, step S611, N).

When the rotation detection unit 105 determines that no rotation occurred, the rotation detection unit 105 notifies the file group copying unit 106 that no rotation occurred (FIG. 7A, step S608).

When the file group copying unit 106 is notified from the rotation detection unit 105 that no rotation occurred (FIG. 8B, step S712, N), the file group copying unit 106 checks whether there is a file which has not been copied in the copy object rotation group (FIG. 8B, step S713). If there is a file which has not been copied (FIG. 8B, step S713, Y), the file group copying unit 106 requests the file copy destination generation unit 107 for copy destination information (step S708). In this embodiment, a file of a file path "C:¥Apache2.2¥logs¥access_log.2" remains uncopied in the file object rotation group "Apache access". As such, the file group copying unit 106 requests for copy destination information corresponding to a set of the file path "C:¥Apache2.2¥logs¥access_log.2", update date and time "2007/12/12 09:59:59.955", current time "2008/01/01 10:00:05.111", and file data "10.34.75.221—[30/Nov/2007:08:30:11+0900] "GET/HTTP/1.1" 200—".

Then, the file copy destination generation unit 107 extracts the file identification information from the request made by the file group copying unit 106, generates file copy destination information corresponding to this file identification information (FIG. 9, step S800), and transmits the generated file copy destination information to the file group copying unit 106 (FIG. 9, step S801). In this embodiment, the file copy destination generation unit 107 generates a copy destination file path "/tmp/copy_tmp/copy_file_000003" and a write destination file path "/tmp/copy_tmp/map_file_000003" for other information, as file copy destination information. The other information includes a file path of the copy origin, file update date and time, i-node, file creation date and time, and a file size, which are stored while being associated with the copy destination file.

When the file group copying unit 106 acquires the file copy destination information from the file copy destination generation unit 107, the file group copying unit 106 copies the copy object file to the copy destination designated in this information (FIG. 8B, step S709). In this embodiment, the file group copying unit 106 copies a file of the file path "C:¥Apache2.2¥logs¥access_log.2" to the storage area of the copy destination file path "/tmp/copy_tmp/copy_file_000003". Further, the file group copying unit 106 copies the file path "C:¥Apache2.2¥logs¥access_log.2" of the copy origin, file update date and time, i-node, file creation date and time, and the file size in the storage area of the file path "/tmp/copy_tmp/map_file_000003" in the form of being associated with the file of the file path "/tmp/copy_tmp/copy_file_000003". It is assumed that the copying is performed successfully.

Then, the file group copying unit 106 determines whether the copying is performed successfully (FIG. 8B, step S710). When the file group copying unit 106 determines that the copying is performed successfully (FIG. 8B, step S710, Y), the file group copying unit 106 makes a rotation detection request for the file which has been copied successfully to the rotation detection unit 105 (FIG. 8B, step S711). In this embodiment, the file group copying unit 106 makes a rotation detection request for the file of the file path "C:¥Apache2.2¥logs¥access_log.2".

When the rotation detection unit 105 receives the rotation detection request, if this request is a rotation detection request for the file which has been copied successfully (FIG. 7A, step S600(*b*)), the rotation detection unit 105 makes a file identification information acquiring request to the file identification information acquiring unit 103 while designating the file path included in the rotation detection request (FIG. 7B, step S609). In this embodiment, the rotation detection unit 105 makes a file identification information acquiring request for the file path "C:¥Apache2.2¥logs¥access_log.2".

When the file identification information acquiring unit 103 receives the file identification information acquiring request from the rotation detection unit 105, if this request is a file identification information acquiring request designating a file path (FIG. 6, step S400), the file identification information acquiring unit 103 acquires file identification information of the designated file path from the copy object file group 108 (FIG. 6, step S404), and transmits the acquired file identification information to the rotation detection unit 105 (FIG. 6, step S405). In this embodiment, the file identification information acquiring unit 103 acquires a set of update date and time "2007/12/12 09:59:59.955", current time "2008/01/01 10:00:05.111", and file data "10.34.75.221—[30/Nov/20087:08:30:11+0900] "GET/HTTP/1.1" 200—", as file identification information corresponding to the designated file path "C:¥Apache2.2¥logs¥access_log.2".

When the rotation detection unit 105 acquires the file identification information from the file identification information acquiring unit 103, the rotation detection unit 105 compares this file identification information with the file identification information acquired in the step S707 of FIG. 8A (FIG. 7B, step S610). It is assumed that the rotation detection unit 105 has acquired the file identification information acquired by the file group copying unit 106 in the step S707 of FIG. 8A, from the file group copying unit 106. In this embodiment, the update date and time "2007/12/12 09:59:59.955" acquired in the step S610 and the update date and time "2007/12/12 09:59:59.955" acquired in the step S707 coincide. Accordingly, the rotation detection unit 105 determines that no rotation occurred (FIG. 7B, step S611, N).

When the rotation detection unit 105 determines that no rotation occurred, the rotation detection unit 105 notifies the file group copying unit 106 that no rotation occurred (FIG. 7A, step S608).

When the file group copying unit 106 is notified from the rotation detection unit 105 that no rotation occurred (FIG. 8B, step S712, N), the file group copying unit 106 checks whether there is a file which has not been copied in the copy object rotation group (FIG. 8B, step S713). If there is no file which has not been copied (FIG. 8B, step S713, N), the file group copying unit 106 notifies the user that copying of the file group of the copy object rotation group has been completed (FIG. 8B, step S714). In this embodiment, the file group copying unit 106 confirms that there is no subsequent file in the rotation group "Apache access", and notifies the user that copying of the file group has been completed. Through these steps, copying of the files in one rotation group is completed.

As described above, in the present embodiment, even in the case of a file group in which the generations of the files are managed by changes in the file names, occurrence of rotation can be detected and the files can be managed properly, in the same manner as the embodiments described above.

It should be noted that the present invention is not limited to the embodiments described above.

The file management devices 100 and 100*a* in the first to fourth exemplary embodiments may be realized by a computer having a CPU, a storage device, and an interface with the outside, and by a program which controls those hardware resources. In this computer, a file management program for realizing the file management method of the present invention is provided in a state of being written on a recording medium such as a flexible disk, a CD-ROM, a DVD-ROM, and a memory card. Then, the CPU writes the program read out from a recording medium into the storage device, and executes the processes described in the first to fourth exemplary embodiments according to the program.

Fifth Exemplary Embodiment

A fifth exemplary embodiment of the present invention will be described. A file management method according to the fifth exemplary embodiment includes creating a rotation group by grouping a file group in which the generations of the files are managed by changes in the file names, and storing information of the rotation group in a rotation group management unit; acquiring file identification information of the files belonging to the rotation group from the file group according to the information of the rotation group, and storing the file identification information in a file identification information management unit; and acquiring file identification information of the rotation group from the file identification information management unit, further acquiring file identification information of the files belonging to the rotation group from the file group according to the information of the rotation group, and comparing the file identification information further acquired from the file group with the file identification information acquired from the file identification information management unit.

A file management device for realizing the above-described file management method includes a rotation group creation unit which creates a rotation group by grouping a file group in which the generations of the files are managed by changes in the file names; a rotation group management unit which stores information of the rotation group; a file identification information acquiring unit which acquires file identification information of files belonging to the rotation group from the file group according to the information of the rotation group; a file identification information management unit which stores the file identification information acquired by the file identification information acquiring unit; and a comparison unit which acquires file identification information of the rotation group from the file identification information management unit, further acquires file identification information of the files belonging to the rotation group from the file group according to the information of the rotation group, and compares the file identification information further acquired from the file group with the file identification information acquired from the file identification information management unit.

The file management device can be realized by installing a file management program in a computer. The file management program causes a computer to perform functions of creating a rotation group by grouping a file group in which the generations of the files are managed by changes in the file names, and storing information of the rotation group in a rotation group management unit; acquiring file identification information of the files belonging to the rotation group from the file group according to the information of the rotation group, and storing the file identification information in a file identification information management unit; and acquiring file identification information of the rotation group from the file identification information management unit, further acquiring file identification information of the files belonging to the rotation group from the file group according to the information of the rotation group, and comparing the file identification information further acquired from the file group with the file identification information acquired from the file identification information management unit.

According to the file management method, the file management device, and the program described above, a group of files in which the generations thereof are managed by changes in the file names can be properly managed, and the versatility of file management can be improved.

The present invention is applicable to a system for collecting log files so as to be used for collecting log files without duplications or omissions, for example.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A file management method comprising:
creating a rotation group by grouping a file group in which generations of files are managed by a change in file names, and storing information of the rotation group in a rotation group management unit;
acquiring file identification information of files belonging to the rotation group from the file group according to the information of the rotation group, and storing the file identification information in a file identification information management unit;
acquiring file identification information of the rotation group from the file identification information management unit, further acquiring file identification information of the files belonging to the rotation group from the file group according to the information of the rotation group, and comparing the file identification information further acquired from the file group with the file identification information acquired from the file identification information management unit; and
upon receiving a copy request in a rotation group unit, copying the files belonging to the rotation group of a copy object to a copy destination, and performing a comparison between the file identification information further acquired from the file group and the file identification information acquired from the file identification information management unit in parallel with the copying,
wherein copying of the files belonging to the rotation group is retried according to a result of the comparison between the file identification information further acquired from the file group and the file identification information acquired from the file identification information management unit.

2. The file management method according to claim 1, wherein upon receiving designation of a file path and designation of a type of the file identification information of the files belonging to the rotation group, the designated file path and the designated type of the file identification information are stored as the information of the rotation group.

3. The file management method according to claim 1, wherein the file identification information is at least one of a file path, file size, file creation date and time, file update date and time, i-node (object identifier), current time, and file data.

4. The file management method according to claim 1, wherein the comparison between the file identification information further acquired from the file group and the file identification information acquired from the file identification information management unit is performed after the copying of the files belonging to the rotation group is performed successfully.

5. The file management method according to claim 1, wherein the file identification information of the files belonging to the rotation group is acquired before and after the copying of the files belonging to the rotation group is performed, respectively.

6. A file management device comprising:
a rotation group creation unit which creates a rotation group by grouping a file group in which generations of files are managed by a change in file names;
a rotation group management unit which stores information of the rotation group;
a file identification information acquiring unit which acquires file identification information of files belonging to the rotation group from the file group according to the information of the rotation group;
a file identification information management unit which stores the file identification information acquired by the file identification information acquiring unit;
a comparison unit which acquires file identification information of the rotation group from the file identification information management unit, further acquires file identification information of the files belonging to the rotation group from the file group according to the information of the rotation group, and compares the file identification information further acquired from the file group with the file identification information acquired from the file identification information management unit; and
a file group copying unit which, upon receiving a copy request in a rotation group unit, copies the files belonging to the rotation group of a copy object to a copy destination, and operates the comparison unit in parallel with the copying,
wherein the file group copying unit copies the files belonging to the rotation group is retried according to a result of the comparison between the file identification information further acquired from the file group and the file identification information acquired from the file identification information management unit.

7. The file management device according to claim 6, wherein the rotation group creation unit creates the rotation group upon receiving designation of a file path and designation of a type of the file identification information of the files belonging to the rotation group as the information of the rotation group.

8. A file management device comprising:
rotation group creation means for creating a rotation group by grouping a file group in which generations of files are managed by a change in file names;

rotation group management means for storing information of the rotation group;

file identification information acquiring means for acquiring file identification information of files belonging to the rotation group from the file group according to the information of the rotation group;

file identification information management means for storing the file identification information acquired by the file identification information acquiring means;

comparison means for acquiring file identification information of the rotation group from the file identification information management means, further acquiring file identification information of the files belonging to the rotation group from the file group according to the information of the rotation group, and comparing the file identification information further acquired from the file group with the file identification information acquired from the file identification information management means; and file group copying means for, upon receiving a copy request in a rotation group unit, copying the file belonging to the rotation group of a copy object to a copy destination, and operating the comparison means in parallel with the copying, wherein the file group copying means copies the files belonging to the rotation group is retried according to a result of the comparison between the file identification information further acquired from the file group and the file identification information acquired from the file identification information management unit.

9. A non-transitory computer-readable data storage medium storing a file management program which causes a computer to:

create a rotation group by grouping a file group in which generations of files are managed by a change in file names, and store information of the rotation group in a rotation group management unit;

acquire file identification information of files belonging to the rotation group from the file group according to the information of the rotation group, and store the file identification information in a file identification information management unit;

acquire file identification information of the rotation group from the file identification information management unit, further acquire file identification information of the files belonging to the rotation group from the file group according to the information of the rotation group, and compare the file identification information further acquired from the file group with the file identification information acquired from the file identification information management unit; and upon receiving a copy request in a rotation group unit, copy the files belonging to the rotation group of a copy object to a copy destination, and perform a comparison between the file identification information further acquired from the file group and the file identification information acquired from the file identification information management unit in parallel with the copying, wherein copying of the files belonging to the rotation group is retried according to a result of the comparison between the file identification information further acquired from the file group and the file identification information acquired from the file identification information management unit.

10. The non-transitory computer-readable data storage medium according to claim 9, wherein in storing the information of the rotation group, when designation of a file path and designation of a type of the file identification information of the files belonging to the rotation group are received, the designated file path and the designated type of the file identification information are stored as the information of the rotation group.

* * * * *